United States Patent
Jeon et al.

(10) Patent No.: US 11,140,559 B2
(45) Date of Patent: Oct. 5, 2021

(54) INTER-NETWORK ACCESS MANAGEMENT FOR SHARED SPECTRUM SYSTEMS

(71) Applicant: Samsung Electronics Co., Ltd., Suwon-si (KR)

(72) Inventors: Jeongho Jeon, San Jose, CA (US); Vishnu Vardhan Ratnam, Plano, TX (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/732,190

(22) Filed: Dec. 31, 2019

(65) Prior Publication Data

US 2020/0221307 A1    Jul. 9, 2020

Related U.S. Application Data

(60) Provisional application No. 62/787,821, filed on Jan. 3, 2019.

(51) Int. Cl.
*H04W 16/14* (2009.01)
*H04W 52/04* (2009.01)

(52) U.S. Cl.
CPC ........... *H04W 16/14* (2013.01); *H04W 52/04* (2013.01)

(58) Field of Classification Search
CPC .............................. H04W 16/14; H04W 52/04
USPC ........................................................ 370/329
See application file for complete search history.

(56) References Cited

U.S. PATENT DOCUMENTS

| 7,526,255 | B2 | 4/2009 | Kruys | |
| 2013/0163570 | A1* | 6/2013 | Zhang | H04W 72/12 370/336 |
| 2013/0329596 | A1* | 12/2013 | Shirakabe | H04W 72/085 370/252 |

(Continued)

FOREIGN PATENT DOCUMENTS

WO    2014101482 A1    7/2014

OTHER PUBLICATIONS

International Search Report and Written Opinion of the International Search Authority in connection with International Application No. PCT/KR2020/000147 dated Apr. 27, 2020, 10 pages.

(Continued)

*Primary Examiner* — Gbemileke J Onamuti

(57) ABSTRACT

Devices and methods for inter-network access management in an shared spectrum wireless communication systems. A method for a method for operating a network entity in a wireless communication system of shared spectrum resources includes transmitting, to a set of neighbor network entities in the wireless communication system, a coordination request message indicating an intended transmission power for a data transmission by the network entity; and receiving, from at least one of the set of neighbor network entities, a coordination response message in response to the coordination request message. The method further includes determining resources of the shared spectrum resources to use for the data transmission based on the intended transmission power and the coordination response message; and transmitting, to at least one terminal in a cell of the network entity, the data transmission based on the determined resources.

18 Claims, 18 Drawing Sheets

(56) References Cited

U.S. PATENT DOCUMENTS

2015/0296387 A1 10/2015 Li et al.
2015/0341921 A1 11/2015 Chen et al.
2015/0373554 A1 12/2015 Freda et al.
2016/0119931 A1 4/2016 Soriaga et al.

OTHER PUBLICATIONS

Federal Communications Commission, "Report and Order and Further Notice of Proposed Rulemaking", FCC 16-89, Jul. 14, 2016, 278 pages.
Federal Communications Commission, "Order on Reconsideration and Second Report and Order", FCC 16-55, May 2, 2016, 123 pages.
Paul et al., "Understanding Traffic Dynamics in Cellular Data Networks", Proceedings IEEE INFOCOM, Apr. 2011, 9 pages.
"5 GHz RLAN; Harmonised Standard covering the essential requirements of article 3.2 of Directive 2014/53/EU", ETSI EN 301 893 V2.0.7, Nov. 2016, 123 pages.
Xu et al., "Understanding Mobile Traffic Patterns of Large Scale Cellular Towers in Urban Environment", IEEE/ACM Transactions on Networking (TON), vol. 25, No. 2, Apr. 2017, pp. 1147-1161.

* cited by examiner

INTER-NETWORK ACCESS MANAGEMENT FOR SHARED SPECTRUM SYSTEMS

CROSS-REFERENCE TO RELATED APPLICATIONS AND CLAIM OF PRIORITY

The present application claims priority to U.S. Provisional Patent Application No. 62/787,821, filed on Jan. 3, 2019. The content of the above-identified patent document is incorporated herein by reference.

TECHNICAL FIELD

The present application relates generally to wireless communication systems, more specifically, the present disclosure relates to inter-network access management in an shared spectrum wireless communication systems.

BACKGROUND

In US, unlicensed or shared spectrums are continuously being opened or planned to be opened by federal communications commission (FCC). For example, 3.55-3.7 GHz CBRS band has a unique three-tiered access model, which includes incumbent (federal user, fixed satellite service), priority access licensees (PALs), and general authorized access (GAA) in descending order of priority [FCC 16-55]. For another example, 5925-7125 MHz band and 5925-6425 MHz band are under consideration in US and EU, respectively, for unlicensed use. Regulation is expected to be finished in 2019-2020 time frame. For another example, 37-38.6 GHz band is expected to be opened. When FCC published the rules for spectrum frontiers (5G), it was suggested that the band could be shared between commercial systems and "future" federal systems. The sharing framework is expected to be distinguished from general unlicensed spectrum [FCC 16-89]. For another example, 60 GHz band had been extended to 57-71 GHz for unlicensed use [FCC 16-89]. Opening more unlicensed or shared spectrums can be seen as a global trend. It can be seen that the spectrum utilizations fluctuate temporally and geographically. Sharing the spectrum via multiplexing between different entities will enable more efficient utilization of the spectrum, whether it is unlicensed or shared spectrum. In existing unlicensed spectrums, e.g., 2.4 GHz, 5 GHz, the channel access is based on random access, i.e., CSMA/CA. It is known that CSMA/CA with exponential back-off lowers the airtime utilization efficiency when the network densifies. Fundamentally, there is no promise on the accessibility of the spectrum. Also, sharing itself is non-cooperative as the sharing is based on regulations set by regulatory bodies and the sharing is controlled by fixed rules, e.g., [EN 301 893].

SUMMARY

The present disclosure relates to inter-network access management in an advanced shared spectrum wireless communication system.

In one embodiment, a network entity in a wireless communication system of shared spectrum resources is provided. The network entity includes a transceiver configured to transmit, to a set of neighbor network entities in the wireless communication system, a coordination request message indicating an intended transmission power for a data transmission by the network entity; and to receive, from at least one of the set of neighbor network entities, a coordination response message in response to the coordination request message. The network entity also includes a processor operably connected to the transceiver. The processor is configured to determine resources of the shared spectrum resources to use for the data transmission based on the intended transmission power and the coordination response message. The transceiver is configured to transmit, to at least one terminal in a cell of the network entity, the data transmission based on the determined resources.

In another one embodiment, a method for operating a network entity in a wireless communication system of shared spectrum resources is provided. The method includes transmitting, to a set of neighbor network entities in the wireless communication system, a coordination request message indicating an intended transmission power for a data transmission by the network entity; and receiving, from at least one of the set of neighbor network entities, a coordination response message in response to the coordination request message. The method further includes determining resources of the shared spectrum resources to use for the data transmission based on the intended transmission power and the coordination response message; and transmitting, to at least one terminal in a cell of the network entity, the data transmission based on the determined resources.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

In the present disclosure, the term "shared spectrum" is used in an inclusive manner without the distinction on the shared spectrum and unlicensed spectrum and the term "shared spectrum" also includes not only the currently available spectrums but also spectrums that will be made available in the future. Thus, the term "shared spectrum" should not be interpreted as a limiting factor in determining the scope of the present disclosure.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: "[FCC 16-89] Federal Communications Commission, REPORT AND ORDER AND FURTHER NOTICE OF PROPOSED RULEMAKING," Jul. 14, 2016; "[FCC 16-55] Federal Communications Commission, ORDER ON RECONSIDERATION AND SECOND REPORT AND ORDER," May 2, 2016; and "[EN 301 893] ETSI EN 301 893, 5 GHz RLAN; Harmonised Standard covering the essential requirements of article 3.2 of Directive 2014/53/EU," V2.0.7 (2016-11).

Figure 1:
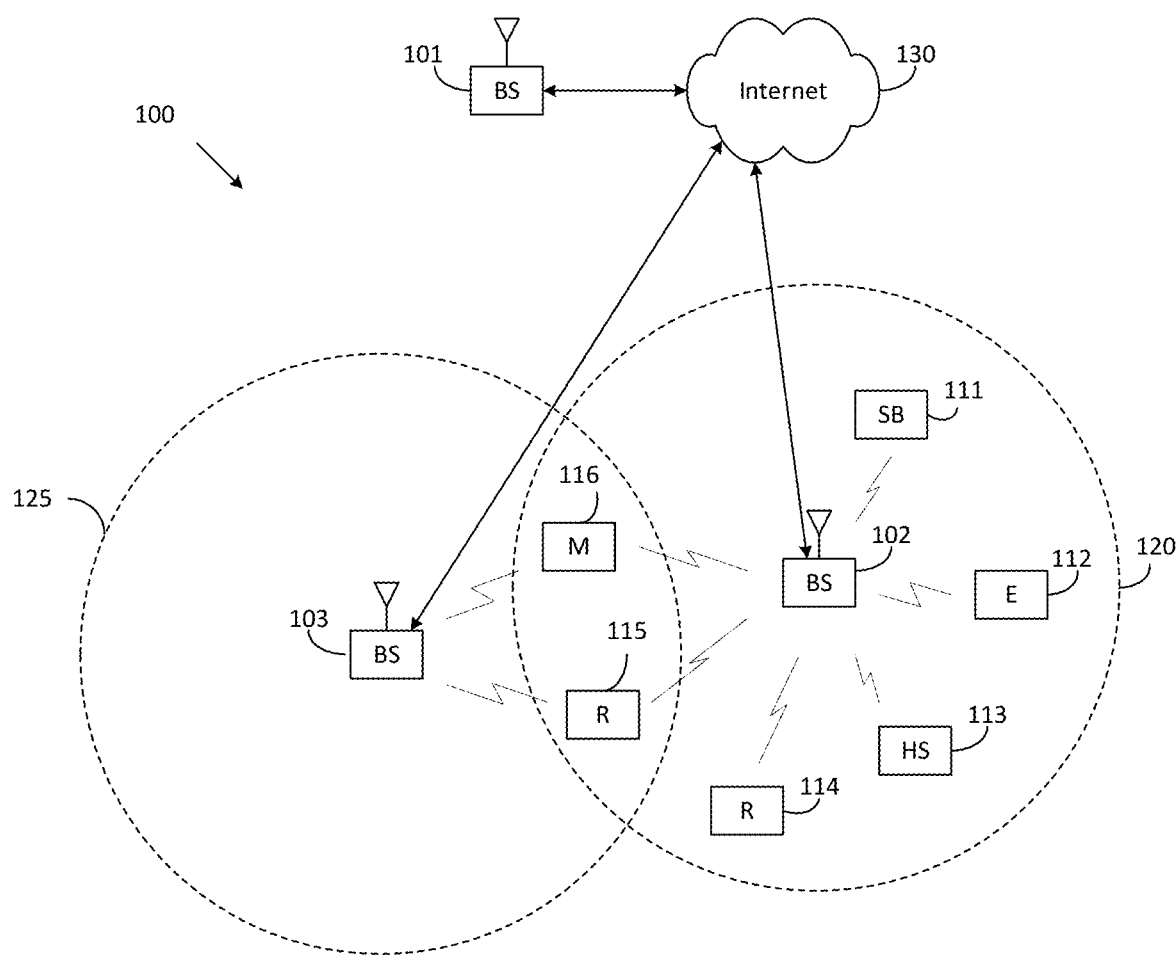
FIG. 1 illustrates an example wireless network according to embodiments of the present disclosure.
Figure 2:
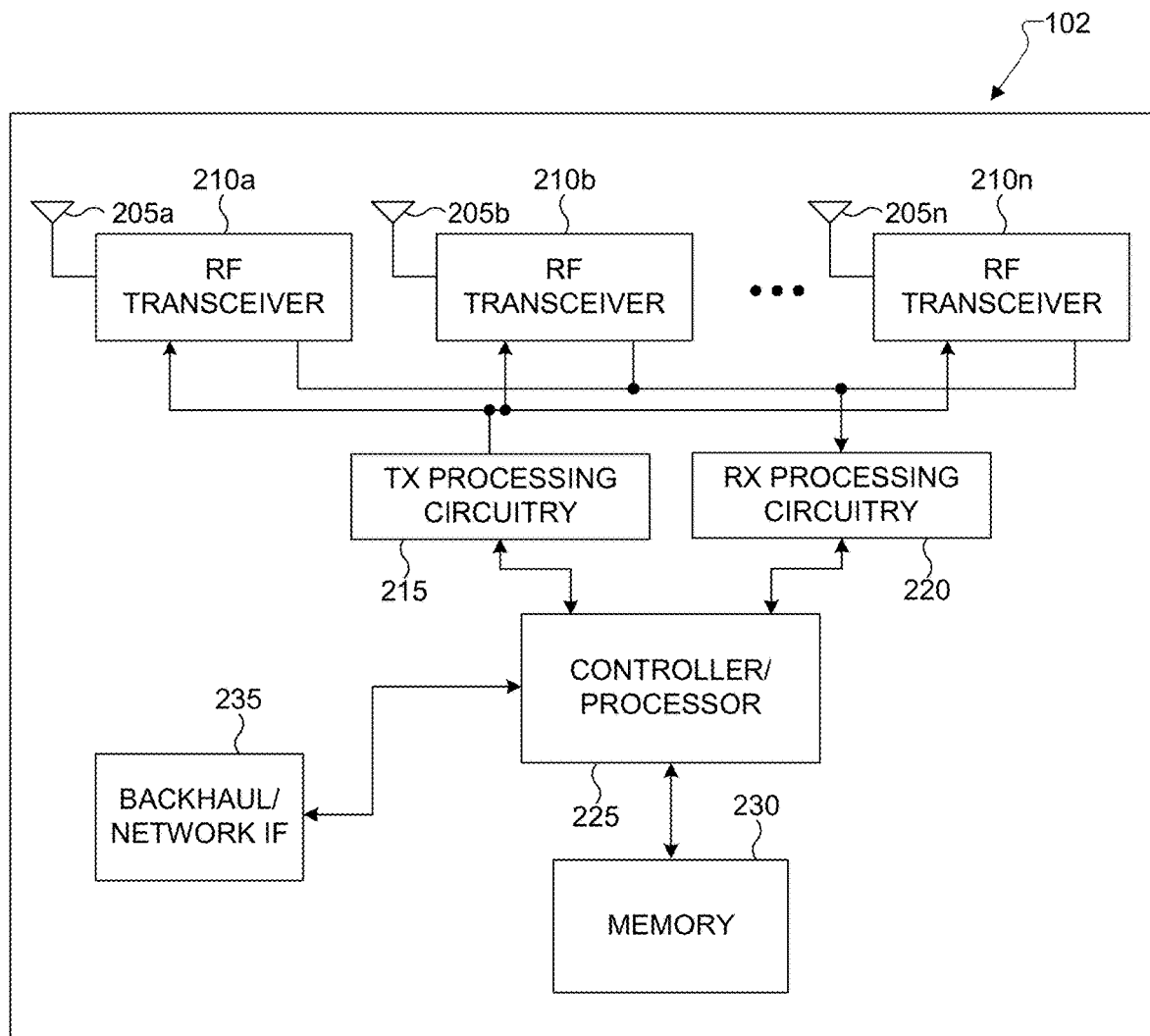
FIG. 2 illustrates an example network entity of a gNB according to embodiments of the present disclosure.
Figure 3:
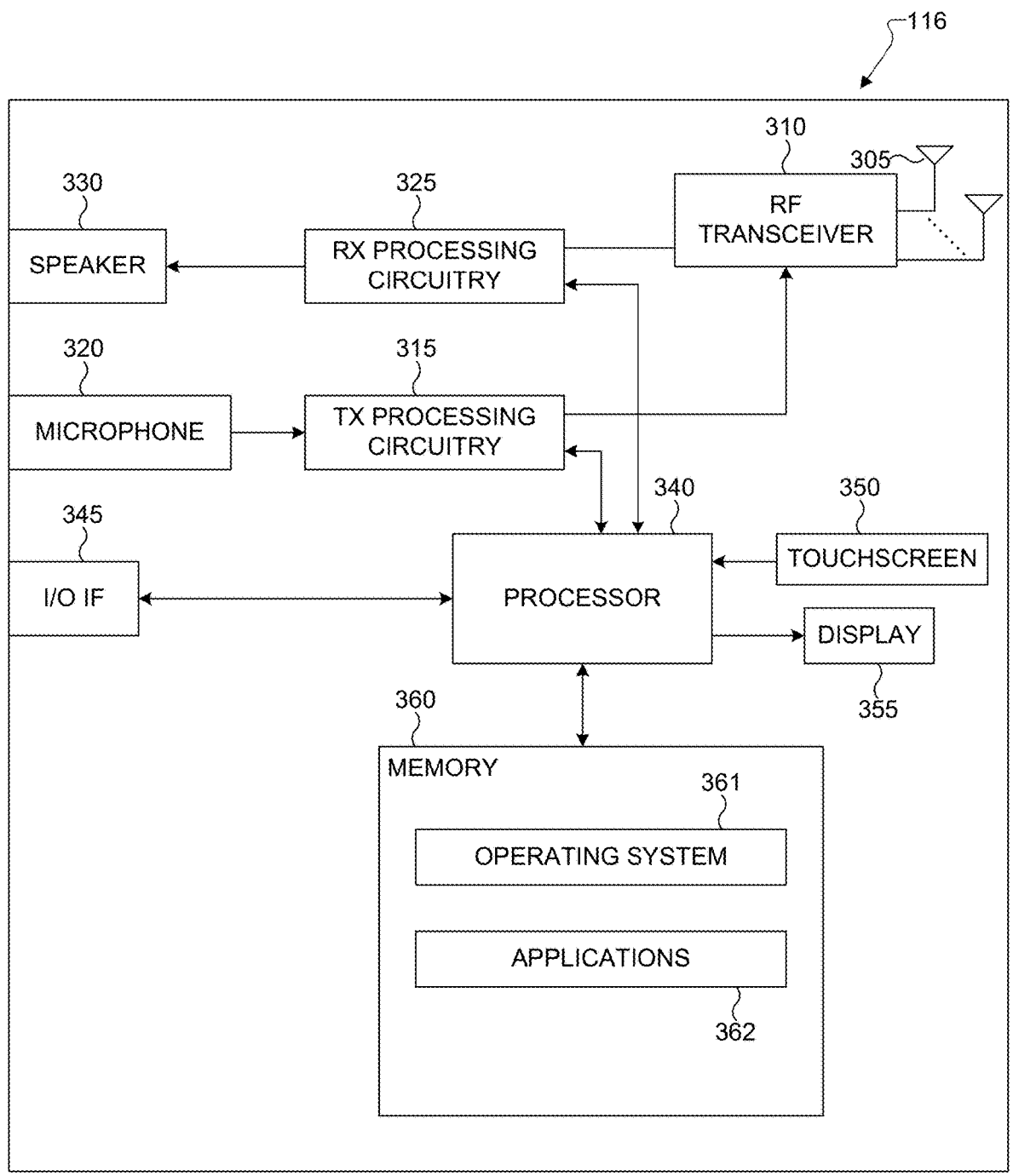
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes network entities including a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "network entity," "base station," or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for reception reliability for data and control information in an advanced wireless communication system. In certain embodiments, and one or more of the gNBs 101-103 includes circuitry, programming, or a combination thereof, for efficient inter-network access management for shared spectrum systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example network entity of a gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an network entity could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT preceding that is known as DFT-spread-OFDM.

Figure 4:
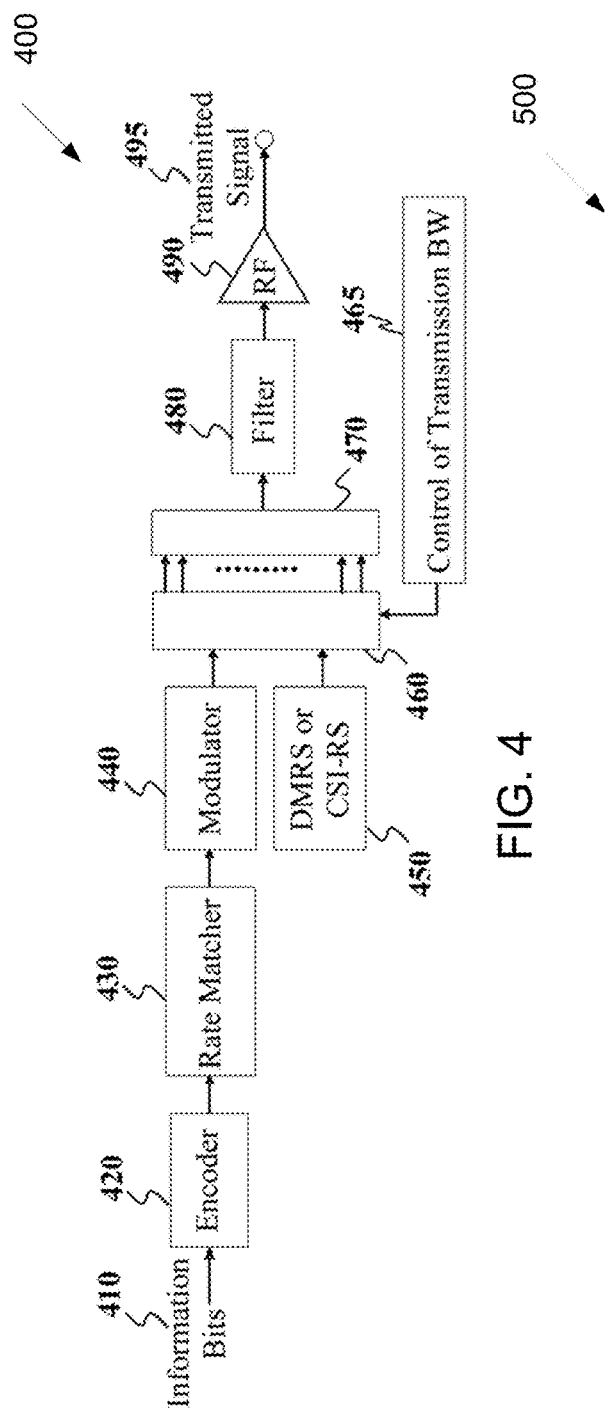
FIG. 4 illustrates an example transmitter structure using OFDM according to embodiments of the present disclosure.

FIG. 4 illustrates an example transmitter structure 400 using OFDM according to embodiments of the present disclosure. For example, the transmitter structure 400 may be include in the gNB 102 or the UE 116. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping circuit 465, an inverse fast Fourier transform (IFFT) is performed by filter 470, a cyclic prefix (CP) is added by CP insertion circuit 480, and a resulting signal is filtered by filter 490 and transmitted by an radio frequency (RF) circuit 495.

Figure 5:
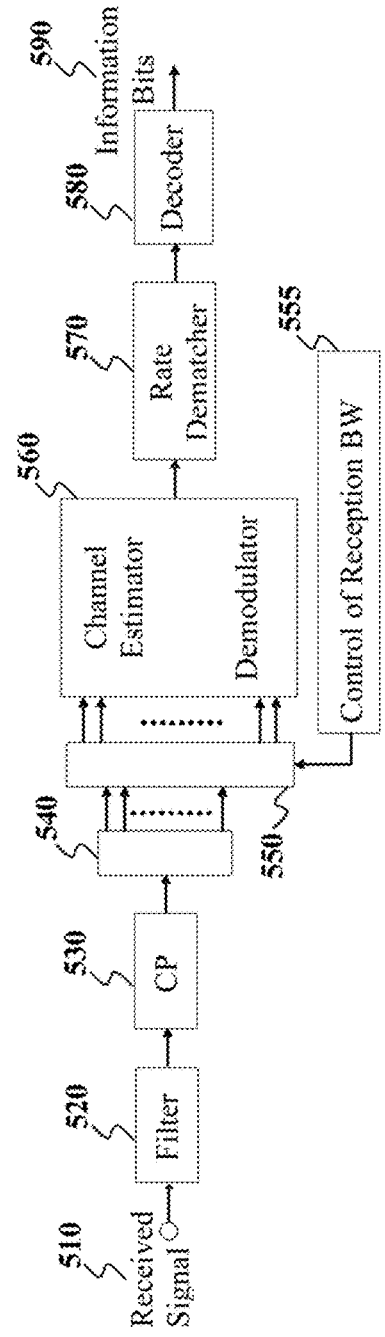
FIG. 5 illustrates an example receiver structure using OFDM according to embodiments of the present disclosure.

FIG. 5 illustrates an example receiver structure 500 using OFDM according to embodiments of the present disclosure. For example, the receiver structure 500 may be included in the gNB 102 or the UE 116. An embodiment of the receiver structure 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal circuit removes a CP 530, a filter 540 applies a fast Fourier transform (FFT), SCs de-mapping circuit 550 de-maps SCs selected by BW selector circuit 555, received symbols are demodulated by a channel estimator and a demodulator circuit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
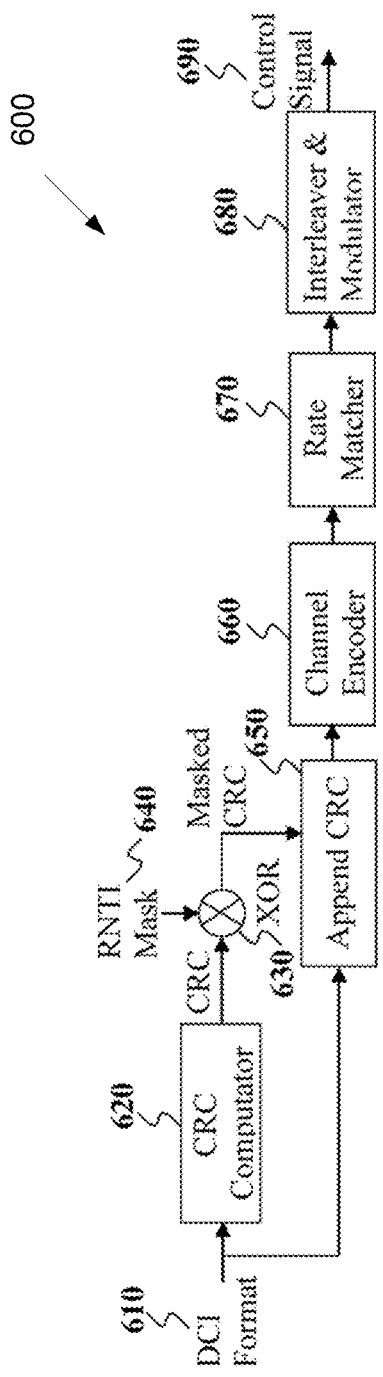
FIG. 6 illustrates an example encoding process for a DCI format according to embodiments of the present disclosure.

FIG. 6 illustrates an example encoding process 600 for a DCI format according to embodiments of the present disclosure. For example, the encoding process 600 may be performed by the gNB 102. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation circuit 620, and the CRC is masked using an exclusive OR (XOR) operation circuit 630 between CRC bits and RNTI bits 640. The XOR operation is defined as XOR (0,0)=0, XOR (0,1)=1, XOR (1,0)=1, XOR (1,1)=0. The masked CRC bits are appended to DCI format information bits using a CRC append circuit 650. An encoder 660 performs channel coding (such as tail-biting convolutional coding or polar coding), followed by rate matching to allocated resources by rate matcher 670. Interleaving and modulation circuits 680 apply interleaving and modulation, such as QPSK, and the output control signal 690 is transmitted.

Figure 7:
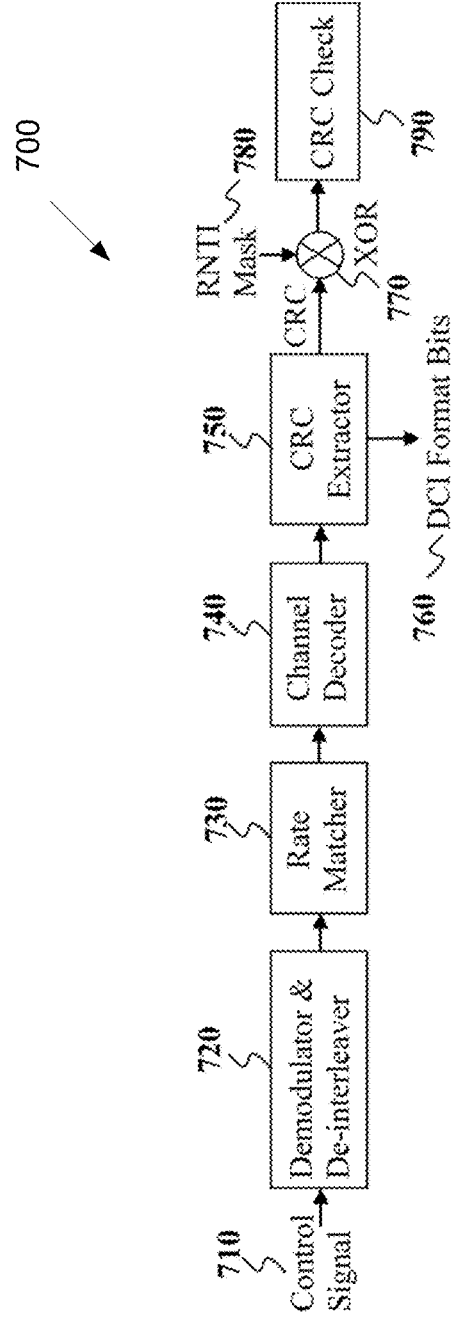
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. For example, the decoding process 700 may be performed by the UE 116. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740.

After decoding, a CRC extractor 750 extracts CRC bits and provides DCI format information bits 760. The DCI format information bits are de-masked 770 by an XOR operation with an RNTI 780 (when applicable) and a CRC check is performed by circuit 790. When the CRC check succeeds (check-sum is zero), the DCI format information bits are considered to be valid. When the CRC check does not succeed, the DCI format information bits are considered to be invalid.

Figure 8:
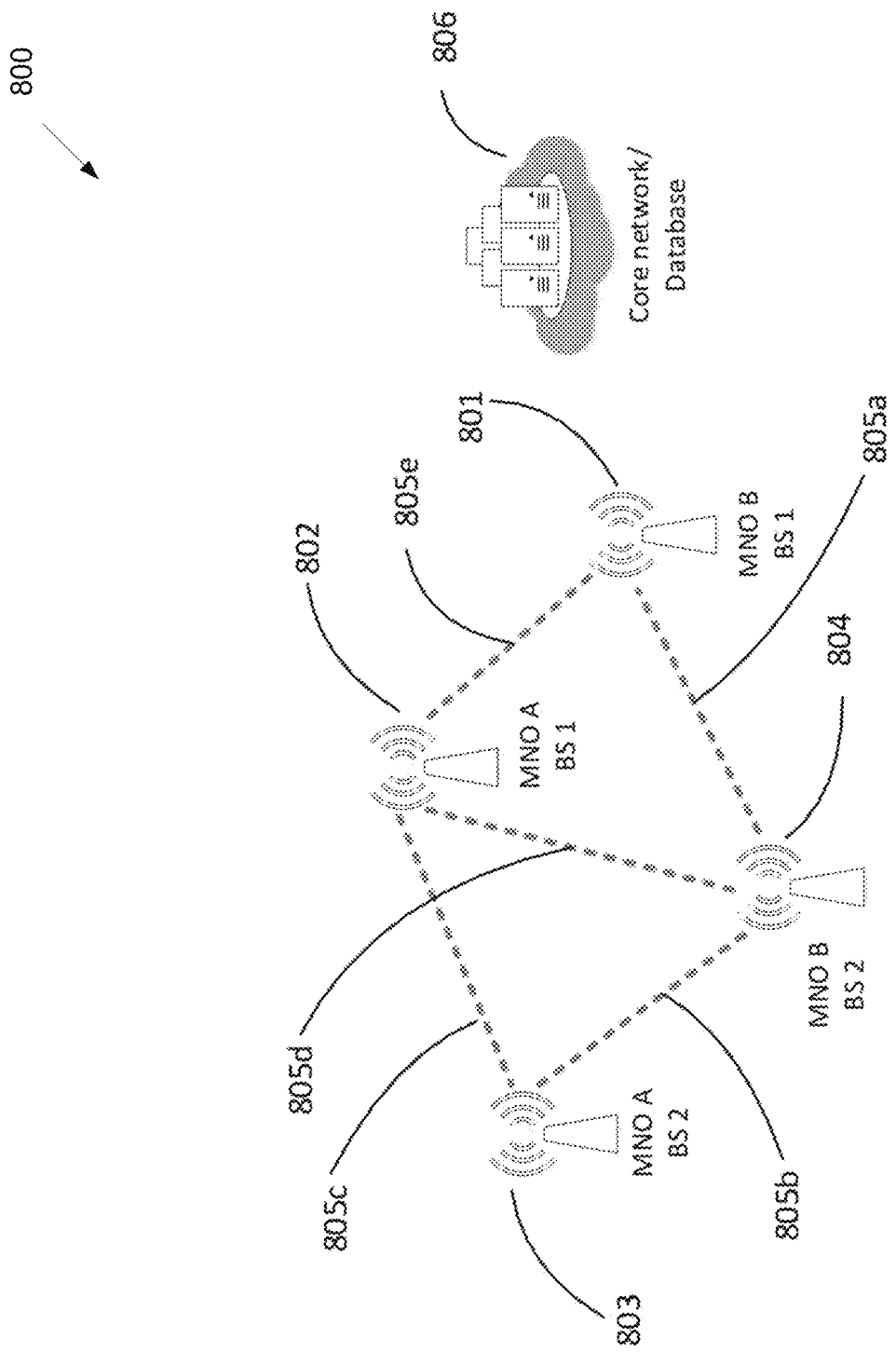
FIG. 8 illustrates an example multiple base stations (BS) of different MNOs according to embodiments of the present disclosure.

FIG. 8 illustrates an example multiple base stations (BS) of different MNOs 800 (e.g., network entities) according to embodiments of the present disclosure. An embodiment of the multiple BS of different MNOs 800 shown in FIG. 8 is for illustration only. Other embodiments are used without departing from the scope of the present disclosure.

FIG. 8 illustrates a schematic diagram illustrating a network 800 for spectrum sharing where multiple BSs from different MNOs coexist in proximity. As an example, a BS 801 and a BS 804 belong to one operator (MNO B) and a BS 802 and a BS 803 belong to another operator (MNO A). The figure should not be interpreted as a limiting factor of the scope of the present disclosure. In other words, there could be multiple different operators with multiple different systems and technologies sharing the spectrum. Elements 805 a, 805 b, 805 c, 805 d, and 805 e show the interfering relationship. An entity 806 can be, as an example, core network of each operator or can be also a database which does not belong to any of the operators and communicates with operators.

Figure 9:
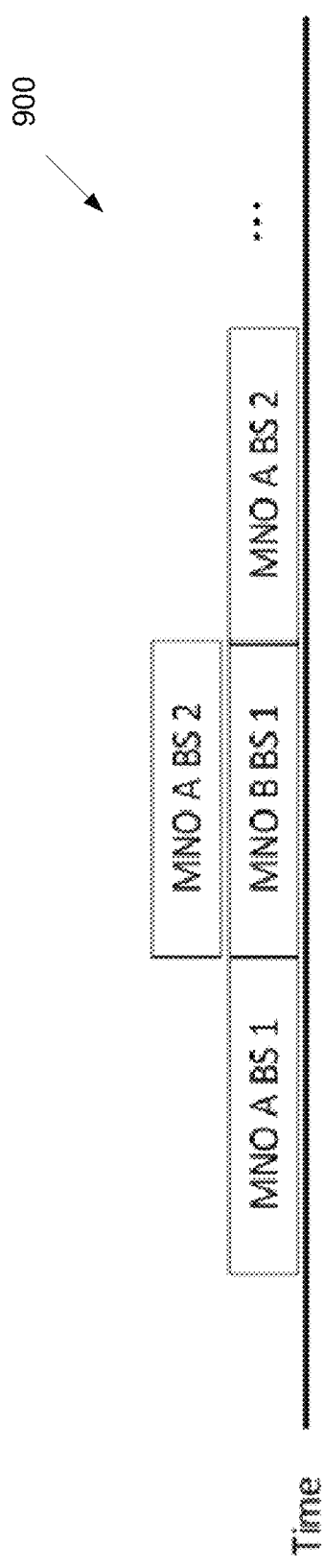
FIG. 9 illustrates an example spectrum sharing according to embodiments of the present disclosure.

FIG. 9 illustrates an example spectrum sharing 900 according to embodiments of the present disclosure. An embodiment of the spectrum sharing 900 shown in FIG. 9 is for illustration only. Other embodiments are used without departing from the scope of the present disclosure.

FIG. 9 illustrates a spectrum sharing situation among different BSs belonging to different MNOs from the network 800. As the BS 801 and the BS 803 are geographically separated and not in the interfering relationship, both of the BSs may transmit simultaneously. On the other hand, as a set of BSs 801, 802, and 804, and a set of BSs 802, 803, and 804 are in a mutually interfering relationship, the set of BSs may share the resources in an orthogonal manner.

The sharing can be enabled in time and/or geographical domains. That is: the spectrum can be shared in a time division multiplexing (TDM) manner between systems/technologies; and the spectrum can be reused simultaneously by geographically separated systems/technologies via spatial reuse.

The sharing framework disclosed in the embodiments of the present disclosure can achieve the above time and/or geographical sharing in a localized and autonomous manner.

Figure 10:
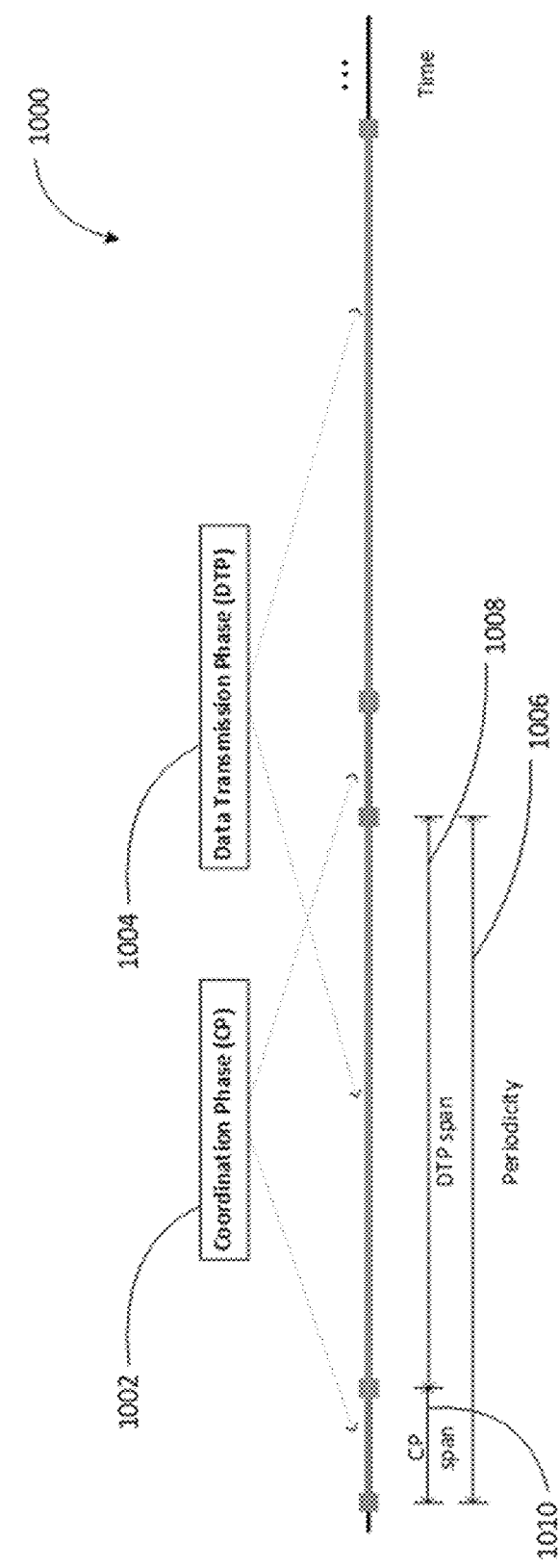
FIG. 10 illustrates an example overall sharing framework according to embodiments of the present disclosure.

FIG. 10 illustrates an example overall sharing framework 1000 according to embodiments of the present disclosure. An embodiment of the overall sharing framework 1000 shown in FIG. 10 is for illustration only. Other embodiments are used without departing from the scope of the present disclosure.

In one embodiment, a sharing framework can include a coordination phase (CP) and a data transmission phase (DTP) to enable the spectrum sharing for the network 800 as illustrated in FIG. 10. The CP, 1002, can be used for over-the-air (OTA) communications between BSs of same/different operators. During the CP, each BS can perform identification of the neighboring BSs, potential parameter negotiation, resource reservation for the following DTP and/or other DTPs, and other coordination operations. The duration of CP 1010 is located within the corresponding periodicity 1006. The DTP 1004 can be used for coordinated data transmissions by BSs according to the resource reservation made during CP, which may also allow opportunistic data transmissions based on listen-before-talk (LBT), e.g., in the cases that the reserved medium is not utilized. The duration of DTP 1008 is indicated. In another embodiment, the CP and DTP can use different frequency or code resources.

The resource utilization efficiency of the provided scheme is proportional to the DTP span 1108 divided by periodicity 1006 in FIG. 10. The tradeoff between resource utilization efficiency and agility to re-coordinate can be seen. In one embodiment, the CP span, DTP span, and periodicity can be fixed. In another embodiment, one or more of CP span, DTP span, or periodicity can be adjusted.

Figure 11:
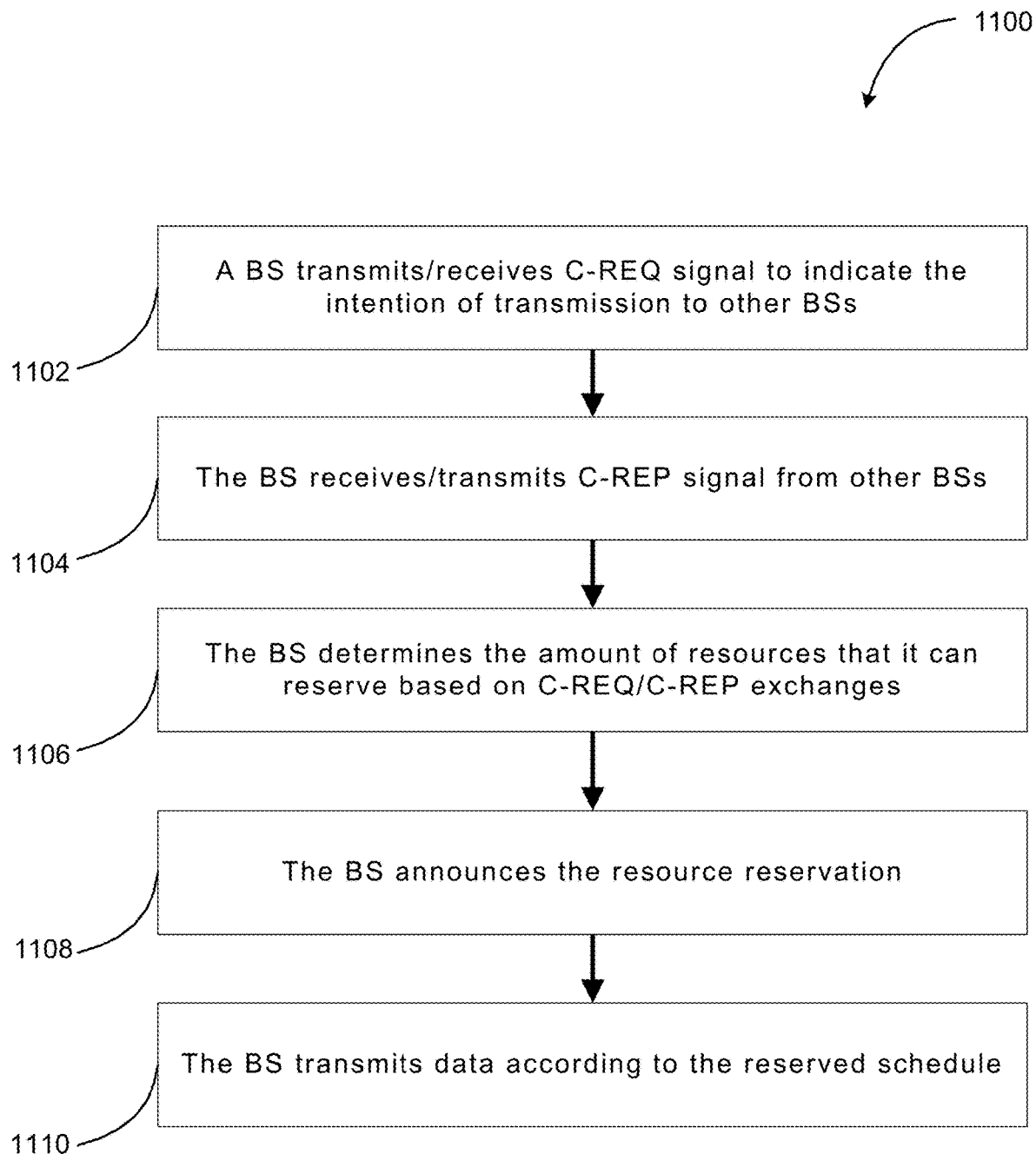
FIG. 11 illustrates a flowchart of a method for sharing framework according to embodiments of the present disclosure.

FIG. 11 illustrates a flowchart of a method 1100 for sharing framework according to embodiments of the present disclosure. For example, the method 1100 may be performed by a network entity such as, for example, gNB 102. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

FIG. 11 illustrates an example of a method 1100 for coordinating and reserving the resources from a BS perspective consistent with embodiments disclosed herein. The method 1100 can be accomplished by the network 800 (e.g., different MNOs), including the BSs 801, 802, 803, and 804, and the network entity 806. At step 1102, a BS transmits a coordination request (C-REQ) message and during the CP 1002, the BS can listen to potential C-REQ message transmitted by other BSs. The transmission of C-REQ message can serve to indicate the intention of data transmission in the following DTP 1004 to other BSs. The C-REQ message can be also used by receiving BSs to measure the signal strength and, thereby, to estimate the expected level of interference during DTP 1004.

In one embodiment, the BS may transmit the C-REQ message omni-directionally, while in another embodiment, the BS may transmit the C-REQ using a beam pattern that corresponds to a transmission of the BS in the following DTP. In yet another embodiment, a BS may transmit the C-REQ using a wider beam pattern in the CP, than the beam patter the BS intends to use in the following DTP. At step 1104, the BS receives coordination response (C-REP) messages from other BSs in response to the C-REQ message transmitted at step 1102. The orders of steps 1102 and 1104 are interchangeable at each BS and a BS may transmit C-REP messages to other BSs in response to the reception of C-REQ at step 1102.

At step 1106, the BS determines the amount of resources that the BS can reserve based on C-REQ/C-REP exchanges at steps 1102 and 1104. At step 1108, the BS announces the resource reservation to other BSs. In reserving the resources, the BS can avoid conflicts with other BSs that the other BSs successfully exchanged C-REP message in a bi-directional manner at step 1102 and 1104. At step 1110, the BS transmits data according to the reserved schedule coordinated at step 1108.

In one embodiment, the CP can include interaction periods and reservation announcement periods. Each interaction period and reservation announcement period can be discretized and have integer number of sub-periods. In another embodiment, the interaction periods and reservation announcement periods can be continuous time spans for the respective periods and accessed arbitrarily.

In various embodiments, the C-REP and/or C-REQ messages disclosed herein may include additional information such as: a BS cell ID (CID), an operator ID (e.g., PLMN ID), a transmission power level, beam information (e.g., 3 dB beamwidth, beam index, etc.), a resource reservation success ratio (e.g., successfully reserved amount vs. requested amount, or successfully reserved attempts vs. total requests, etc.), a priority level in sharing, a BW amount requested, etc.

Figure 12:
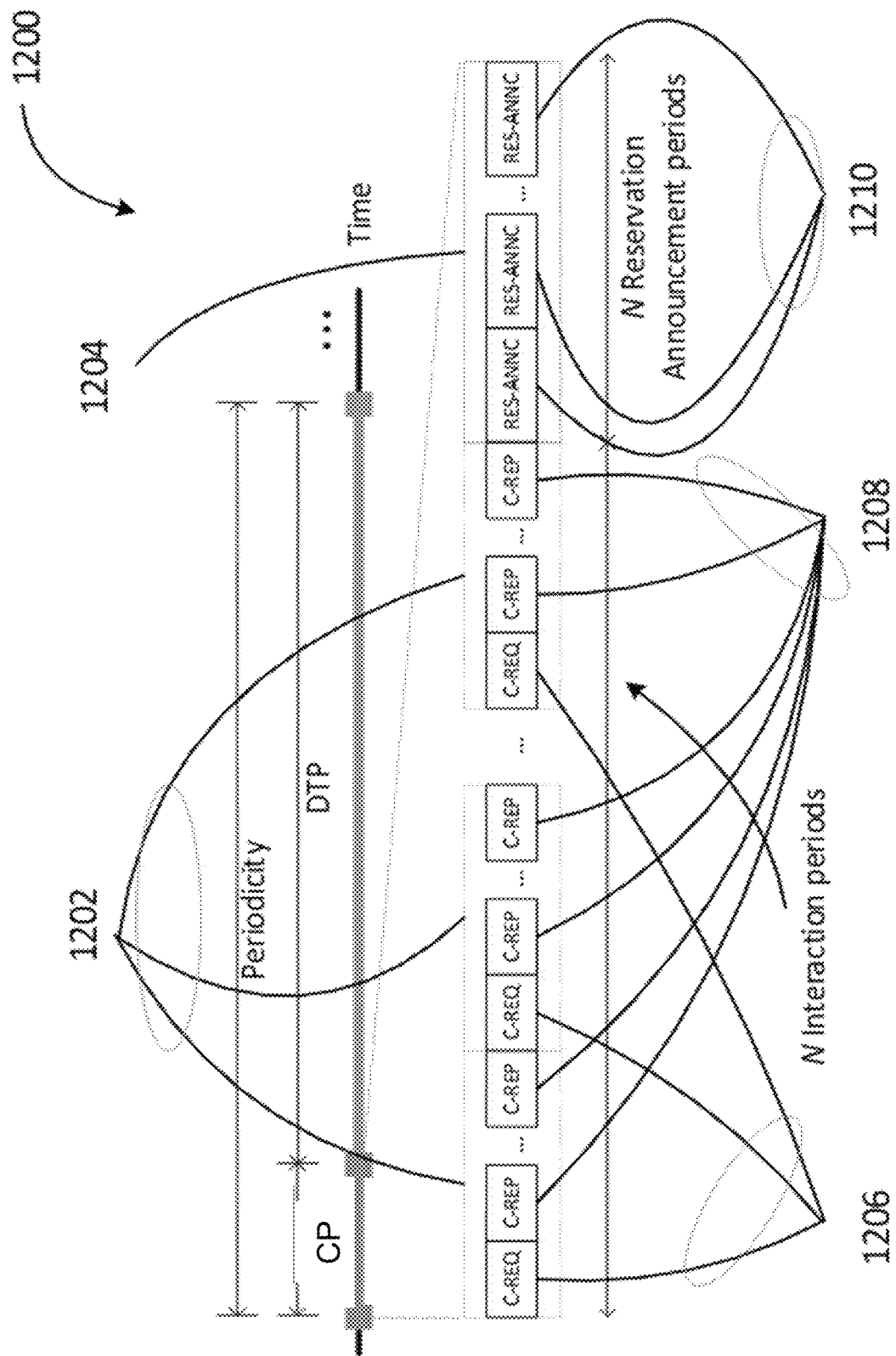
FIG. 12 illustrates an example coordination period according to embodiments of the present disclosure.

FIG. 12 illustrates an example coordination period 1200 according to embodiments of the present disclosure. An embodiment of the coordination period 1200 shown in FIG. 12 is for illustration only. Other embodiments are used without departing from the scope of the present disclosure.

FIG. 12 illustrates an exemplary structure of the CP to enable the spectrum sharing for the network 800. Each interaction period 1202 is denoted. Each reservation announcement period 1210 is denoted. A BS may have a designated interaction period number, in which the C-REQ message is transmitted in the beginning of the designated interaction period 1206. A BS may also have a designated order of transmitting C-REP messages in each of the interaction period 1208.

In one embodiment, the order of C-REP message transmission is repeated over interaction periods and a BS may be assigned multiple periods in which the BS can transmit a C-REP message. In another embodiment, the order of C-REP message transmission changes over interaction periods. In another embodiment, the C-REP transmission happens after all the C-REQ messages are obtained. In another embodiment the C-REPs may be avoided, and each BS determines resource allocation only using the C-REQ messages each BS receives. In one embodiment, the C-REPs occupy the same time, frequency or code resources as the C-REQ messages, while in another embodiment the C-REPs may occupy different time, frequency or code resources.

Figure 13:
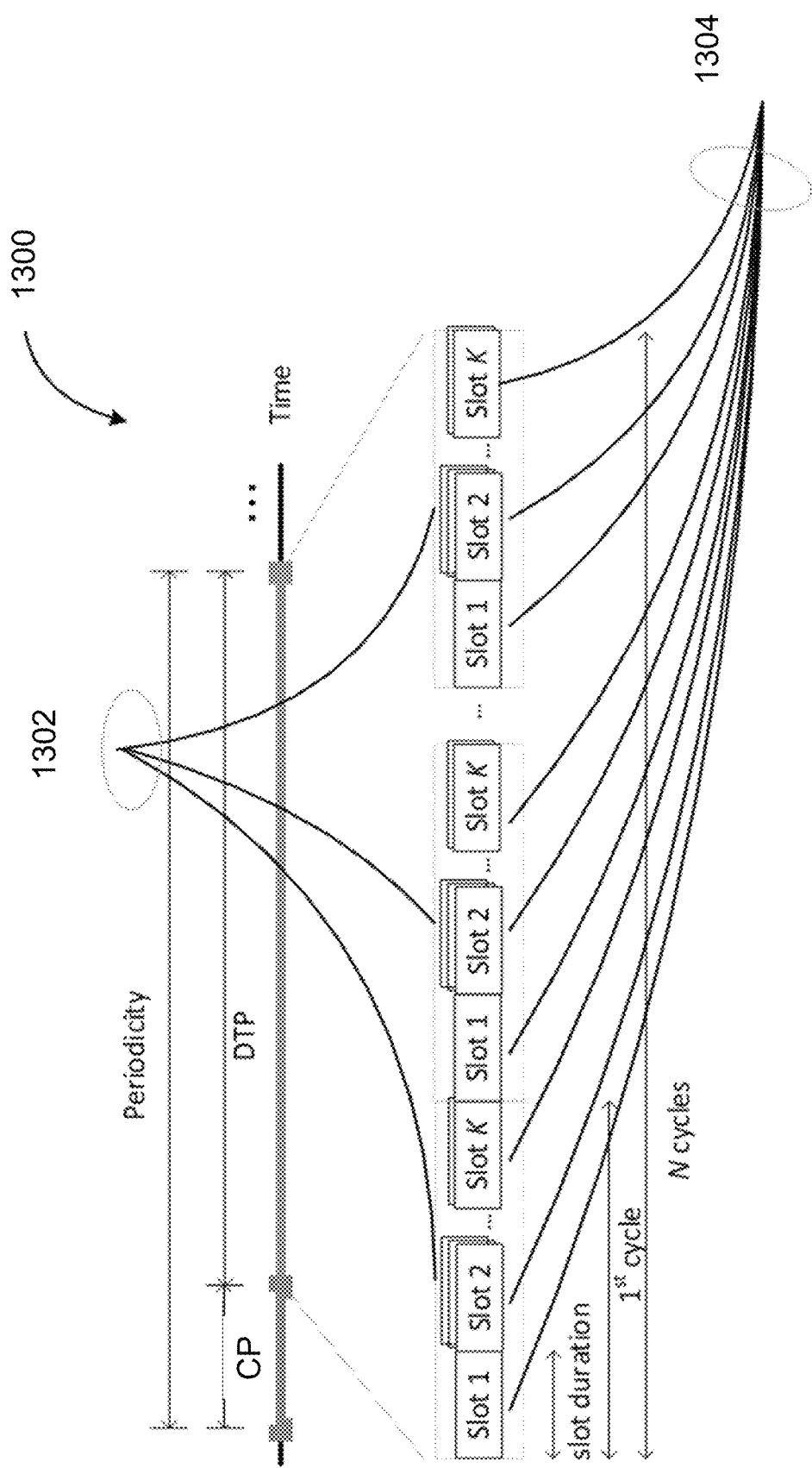
FIG. 13 illustrates an example DTP structure according to embodiments of the present disclosure.

FIG. 13 illustrates an example DTP structure 1300 according to embodiments of the present disclosure. An embodiment of the DTP structure 1300 shown in FIG. 13 is for illustration only. Other embodiments are used without departing from the scope of the present disclosure.

In some embodiments, DTP structures are provided. In one embodiment, each DTP consists of N cycles (N≥1) and each cycle consists of K slots. FIG. 13 illustrates an exemplary DTP structure consisting of N cycles 1302 and K slots in cycles 1304. In another embodiment, the number of slots in a cycle may be different among the cycles and one or multiple of slots can be included in a cycle.

In one another embodiment of DTP structure, each DTP can be flexibly structured such that in RES-ANNC, the reserved duration can be indicated by a pair {starting instance, duration} or, alternatively, a pair {starting instance, end instance}. More than one disjoint time durations can be reserved so long as the total duration does not exceed the allowance.

As illustrated in FIG. 11, a BS transmits coordination request (C-REQ) message at operation 1102. The C-REQ transmission may occur in one of the interaction periods denoted by 1206.

Figure 14:
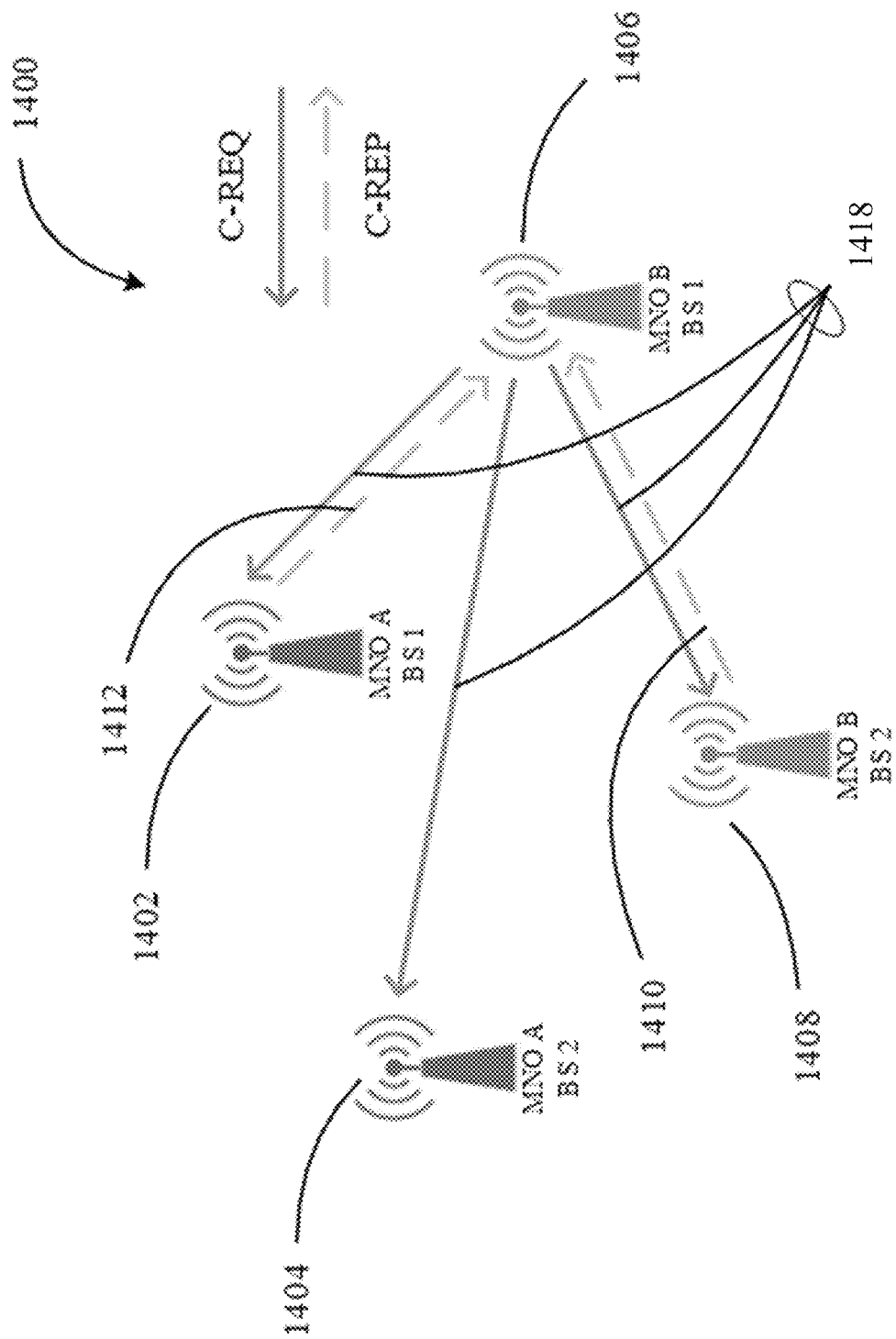
FIG. 14 illustrates an example coordination message exchanges according to embodiments of the present disclosure.

FIG. 14 illustrates an example coordination message exchanges 1400 according to embodiments of the present disclosure. An embodiment of the coordination message exchanges 1400 shown in FIG. 14 is for illustration only. Other embodiments are used without departing from the scope of the present disclosure.

FIG. 14 illustrates an embodiment on a network exchanging the C-REP/C-REQ coordination messages. As an example, a BS 1406 transmits the C-REQ message over wireless links 1408. In one embodiment, the C-REQ message can be transmitted in an omni-directional manner from a BS. In another embodiment, the C-REQ message can be transmitted in a directional manner with optional beam sweeping over different directions.

In one example, a BS 1402 and a BS 1408 respond to the BS 1406 with C-REP messages transmitted over wireless links 1412 and 1410, respectively, while a BS 1404 do not respond to the BS 1406 with any C-REP message. The response message, C-REP, can be transmitted to the originator of C-REQ in multiple different ways.

In one embodiment, C-REP can be transmitted in a time staggered manner among corresponding BSs, e.g., TDM as exemplified in schematic diagram 1100. In another embodiment, the C-REP message can be transmitted simultaneously among corresponding BSs but with different signatures to distinguish the signals, e.g., using different codes, beam directions, or frequency resources among the BSs, etc.

In one embodiment, C-REQ can be transmitted with a power $P_{Tx}$, which may be set as the same with the intended $P_{Tx}$ during DTP 1004 in FIG. 10 for data transmission. This can allow neighboring BS s to estimate the actual level of interference during the data transmission. In another embodiment, a C-REQ message can be transmitted with $P_{Tx}$, which may be set as Δ dB higher than the intended $P_{Tx}$ during DTP. This can allow more reliable communication during CP as high reliability of communication during the coordination phase is of importance. In this case, the power adjustment, Δ dB, which can be used to boost or reduce the power depending on situations, needs to be indicated in the C-REQ message such that the neighboring BSs can know what may be the actual level of interference during the data transmission without the Δ dB power adjustment.

Figure 15:
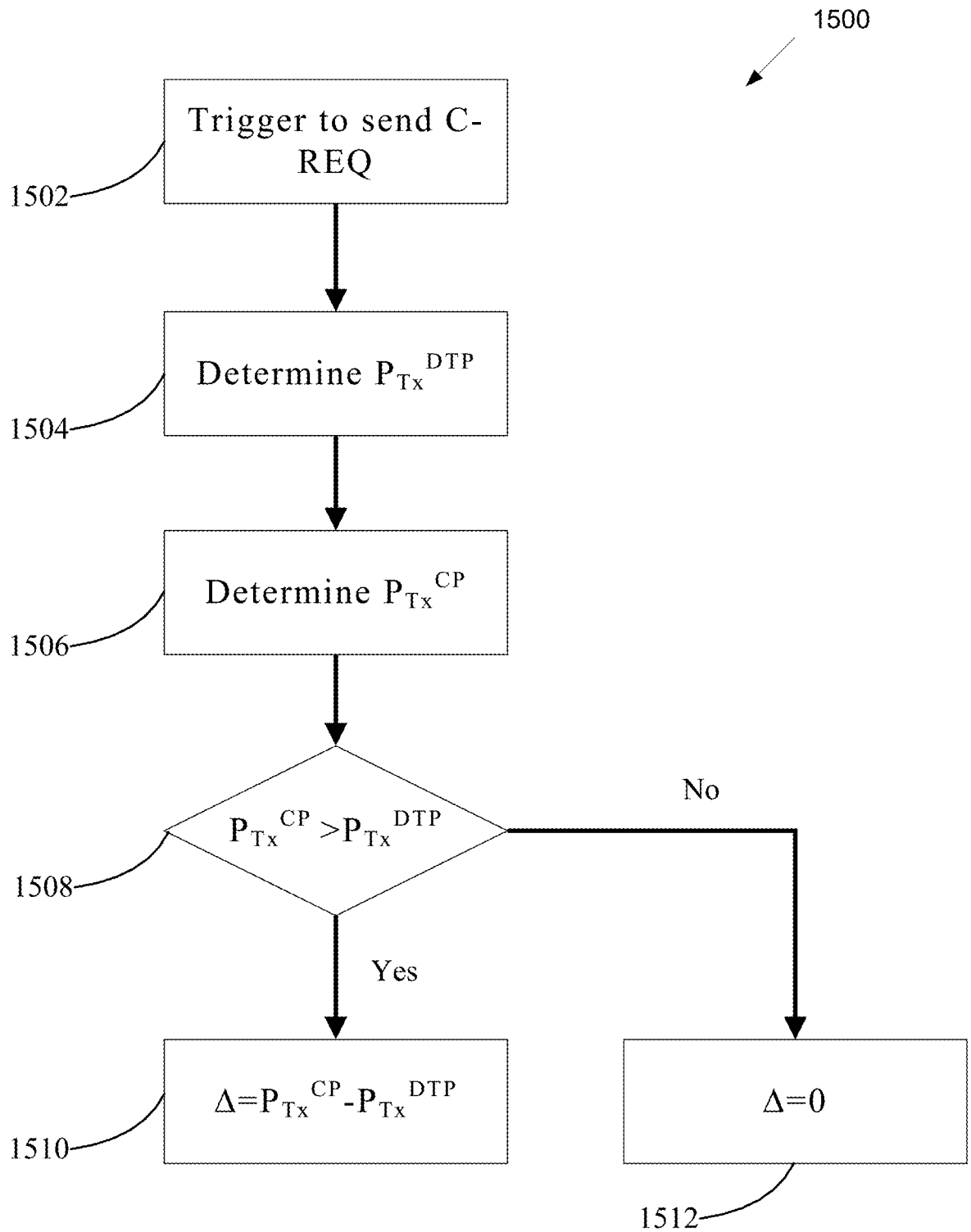
FIG. 15 illustrates a flowchart of a method for determining the power adjustment for CP according to embodiments of the present disclosure.

FIG. 15 illustrates a flowchart of a method 1500 for determining the power adjustment for CP according to embodiments of the present disclosure. For example, the method 1500 may be performed by a network entity such as, for example, gNB 102. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

FIG. 15 illustrates a method 1500 for determining the transmission power adjustment during CP 1002 from a BS perspective consistent with embodiments disclosed herein, as may be performed by each BS transmitting a C-REQ message. In one network, a BS 1406 can perform the method 1500 to determine the power for C-REQ transmission. At step 1504, the BS determines the transmission power level, $P_{Tx}^{DTP}$, to be used during the reserved schedule in DTP. At step 1506, the BS determines the transmission power level, $P_{Tx}^{CP}$, to be used during CP. If the transmission power levels between CP and DTP are different, the amount of power adjustment is calculated as at step 1510.

In one embodiment, power adjustment value Δ dB is indicated in a C-REQ message. In another embodiment, a power adjustment value Δ dB can be negotiated between networks or entities controlling different networks or between neighboring BSs. As an example, such negotiation can happen through a C-REP message exchanges or through a core network.

In each interaction period, neighboring BSs may listen to the C-REQ message and determine to respond with a C-REP message or not. As an example, such determination can be based on the received signal strength of the C-REQ message compared to a certain threshold. One of such threshold rule can be for example to compare $P_{Rx}^{C\text{-}REQ}$ with $TH(P_{Tx}^{DTP})+\Delta$, where $P_{Rx}^{C\text{-}REQ}$ is the received signal power from a BS transmitting C-REQ, $P_{Tx}^{DTS}$ is the intended transmission power during DTP of a node sending C-REP, and TH(•) is a function which can output a threshold value depending on the input transmission power.

Figure 16:
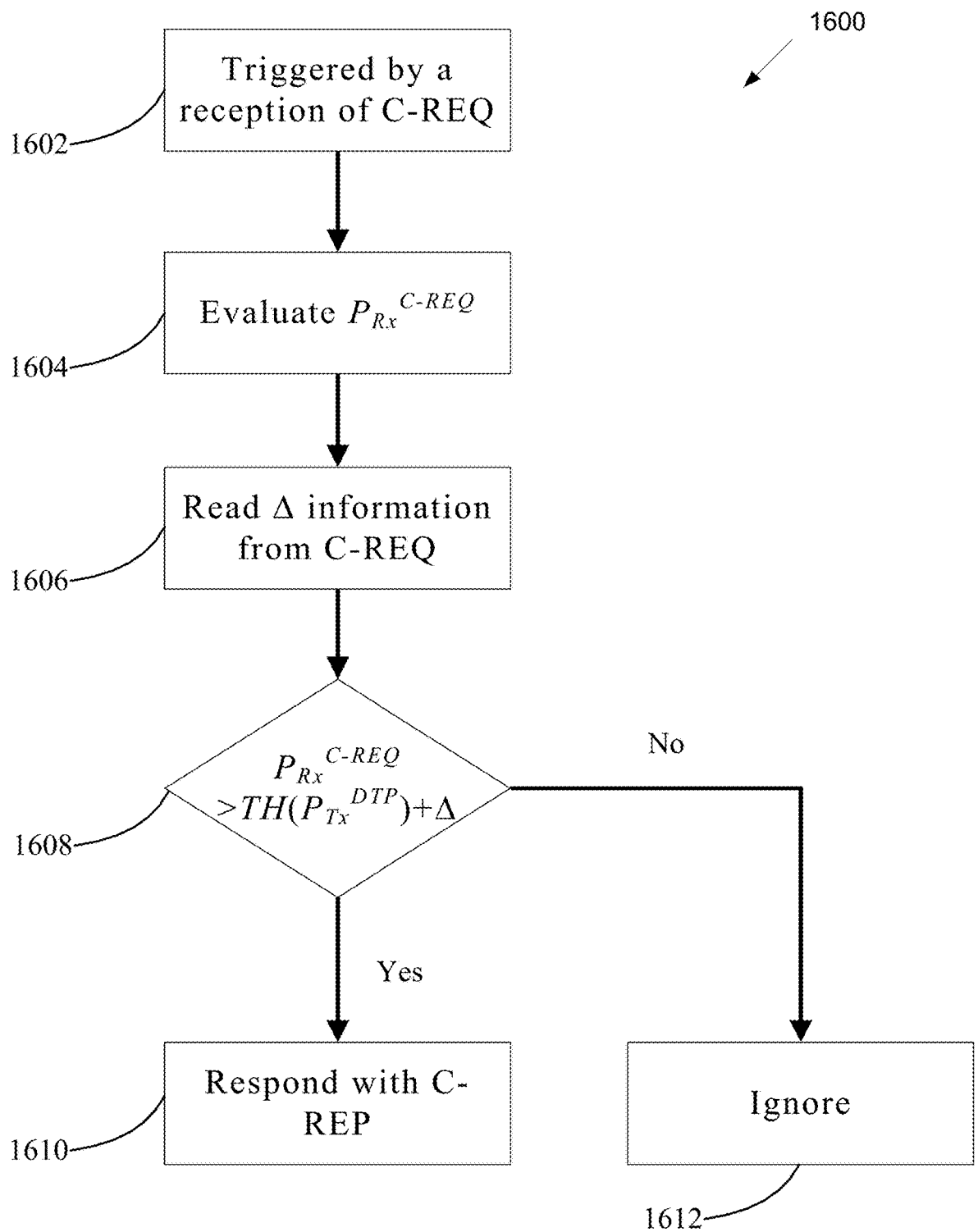
FIG. 16 illustrates a flowchart of a method for deciding the C-REP response according to embodiments of the present disclosure.

FIG. 16 illustrates a flowchart of a method 1600 for deciding the C-REP response according to embodiments of the present disclosure. For example, the method 1600 may be performed by a network entity such as, for example, gNB 102. An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

FIG. 16 illustrates an exemplary method 1600 to determine the C-REP transmission in response to the reception of a C-REQ message from a BS perspective consistent with embodiments disclosed herein. The method 1600 can be triggered by a reception of a C-REQ message as indicated by step 1602. At step 1604, a BS evaluates the received C-REQ signal strength.

In one embodiment, a C-REQ signal may include a signal modulated by a sequence that can be detected with a correlator type receiver. There could be many variations on the sequence type that can be included in the C-REQ signal. The correlator output level can be one example of measured C-REQ signal strength. Other methods are not precluded such as an energy detection-based scheme. If a C-REQ message includes power adjustment information, i.e., Δ dB, then the BS may read the information from the C-REQ message as at step 1606. If the C-REQ message does not include power adjustment information, then Δ can be set to zero and step 1606 can be omitted. At operation 1608, the BS compares $P_{Rx}^{C\text{-}REQ}$ with $TH(P_{Tx}^{DTP})+\Delta$ and determines to respond with the C-REP message or not as at steps 1610 and 1612.

Figure 17:
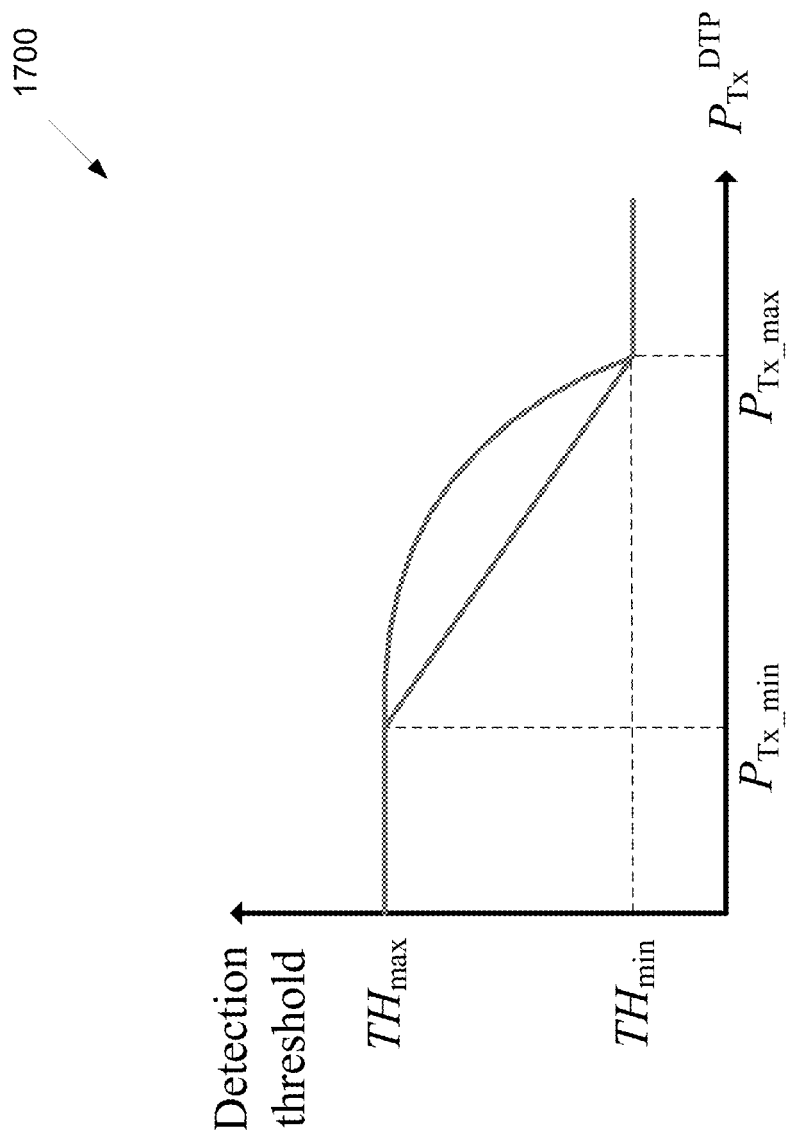
FIG. 17 illustrates an example detection threshold function according to embodiments of the present disclosure.

FIG. 17 illustrates an example detection threshold function 1700 according to embodiments of the present disclosure. An embodiment of the detection threshold function 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

FIG. 17 illustrates a function TH(•) which can be employed to determine detection threshold. The function can be realized in various forms. As an example, the function may include one or multiple of upper bound, a lower bound, a linear expression, and a non-linear expression.

Through method 1500 as illustrated in FIGS. 15 and 1600 as illustrated in FIG. 16, each BS may determine a set of BSs that the set of BSs needs to share the resource in an orthogonal manner and another set of BSs with which the other set of BSs can spatially reuse and share the resource. During the reservation announcement period, each BS may send out a schedule of intended transmissions during DTP in the RES-ANNC message at step 1108.

During reservation announcement period 1210, a BS may listen to RES-ANNC signal from other BSs during non-designated reservation announcement periods which may be earlier than a designated period of the BS, and the BS may determine a resource reservation in a non-conflicting manner with other BSs that the BS has exchanged a C-REP message bi-directionally.

A BS can transmit data in DTP, 1004 as illustrated in FIG. 10, as at step 1110 as illustrated in FIG. 11 according to the schedule which may be announced during the reservation announcement period 1210 as illustrated in FIG. 12. It is possible that a BS may stay idle during some of the reserved resource. It may be due to the emptiness in an outgoing buffer of the BS. It may be due to other reasons as well. In one embodiment, unused resources can be utilized by other BSs. In another embodiment, a resource, which is currently in use, can be still utilized by other BSs. In this case, the secondary system may need to manage such that a transmission power is low, and it does not adversely affect the on-going transmission.

Figure 18:
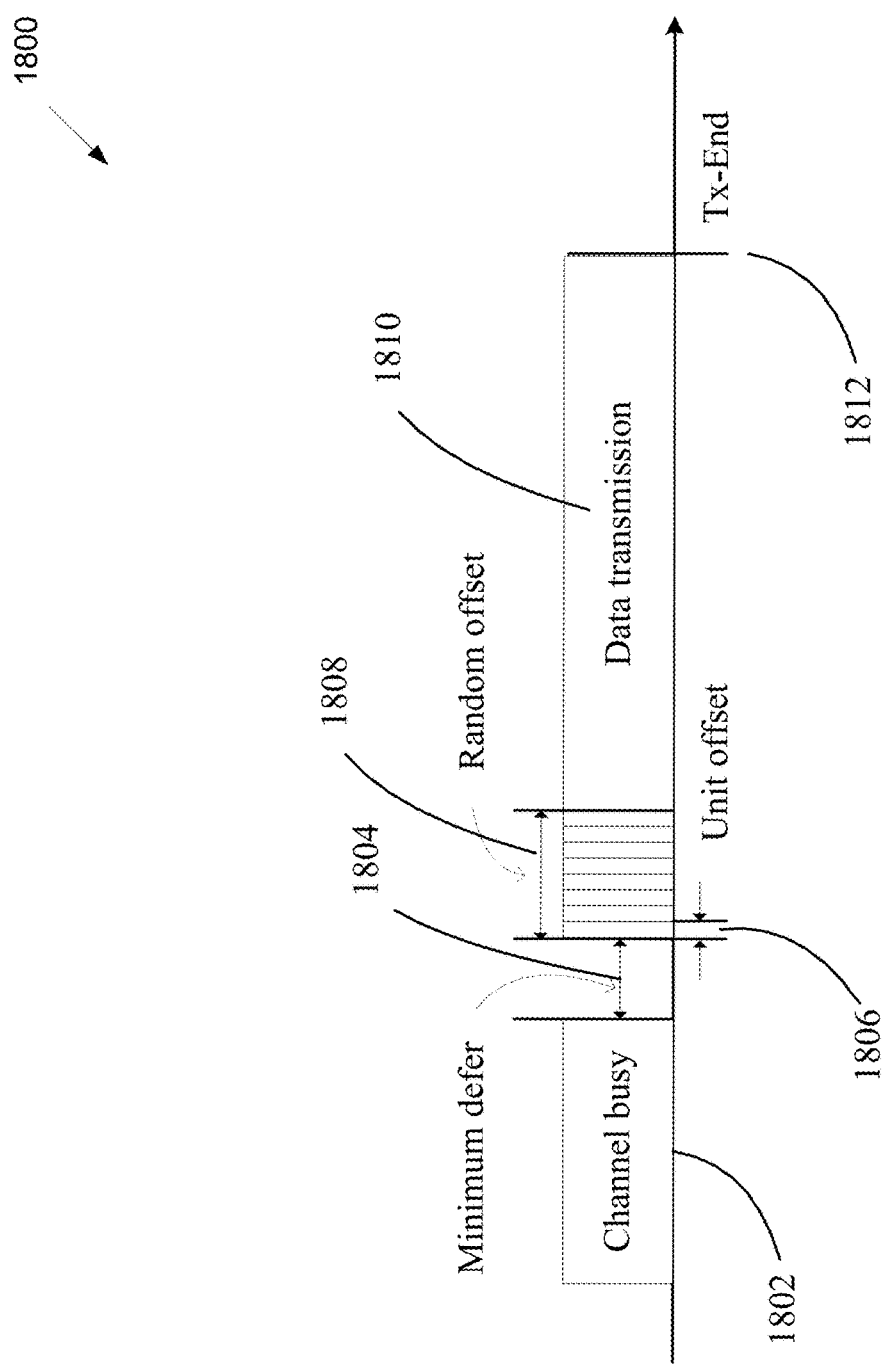
FIG. 18 illustrates an example channel sensing for opportunistic data transmission according to embodiments of the present disclosure.

FIG. 18 illustrates an example channel sensing for opportunistic data transmission 1800 according to embodiments of the present disclosure. An embodiment of the channel sensing for opportunistic data transmission 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

FIG. 18 illustrates an embodiment on channel sensing for opportunistic data transmission. 1802 shows that the resource may currently be in used by a BS which reserved the resource or by another secondary system opportunistically utilizing the resource. Following the channel busy state, there may be a minimum defer duration 1804 denoted by $D_{min}$ left idle as the original owner may resume the transmission. Thus, this minimum defer duration is a means of providing higher priority to the BS which reserved the medium. After $D_{min}$ duration of inactivity, it may be regarded that the original owner has released the reserved medium.

After a defer duration is sensed idle, a BS may perform additional channel sensing with optional random backoff. The time unit of each backoff is denoted by 1806. There could be multiple backoff time units as denoted by 1808. In one embodiment, the number of random backoff time units is randomly determined. As an example, a random number can be uniformly drawn from [X, Y] value range.

In one embodiment, X can be 0. In one embodiment, Y, namely CWS, is configured or informed to the BSs. In another embodiment, Y can be a function of the number of interaction period N during CP in 1202 as illustrated in FIG. 12.

In another embodiment, Y can be a function of the number of C-REP messages transmitted by the BS performing channel sensing. In yet another embodiment, Y can be varying and negotiated between the operators. In one embodiment Y can be common. In another embodiment, Y can be cell specific. In yet another embodiment, Y can be operator specific. After successful channel sensing over the optional random backoff period, the BS may start data transmission as denoted by 1810 until Tx-End point 1812. In one embodiment, the Tx-End point may be aligned to one of the slot boundaries within DTP in the structure 1300 illustrated in FIG. 13.

In another embodiment, an opportunistic transmission may be managed to not go beyond the indicated reservation end instance from the original owner of the reserved resource which may be indicated in a RES-ANNC message.

Figure 19:
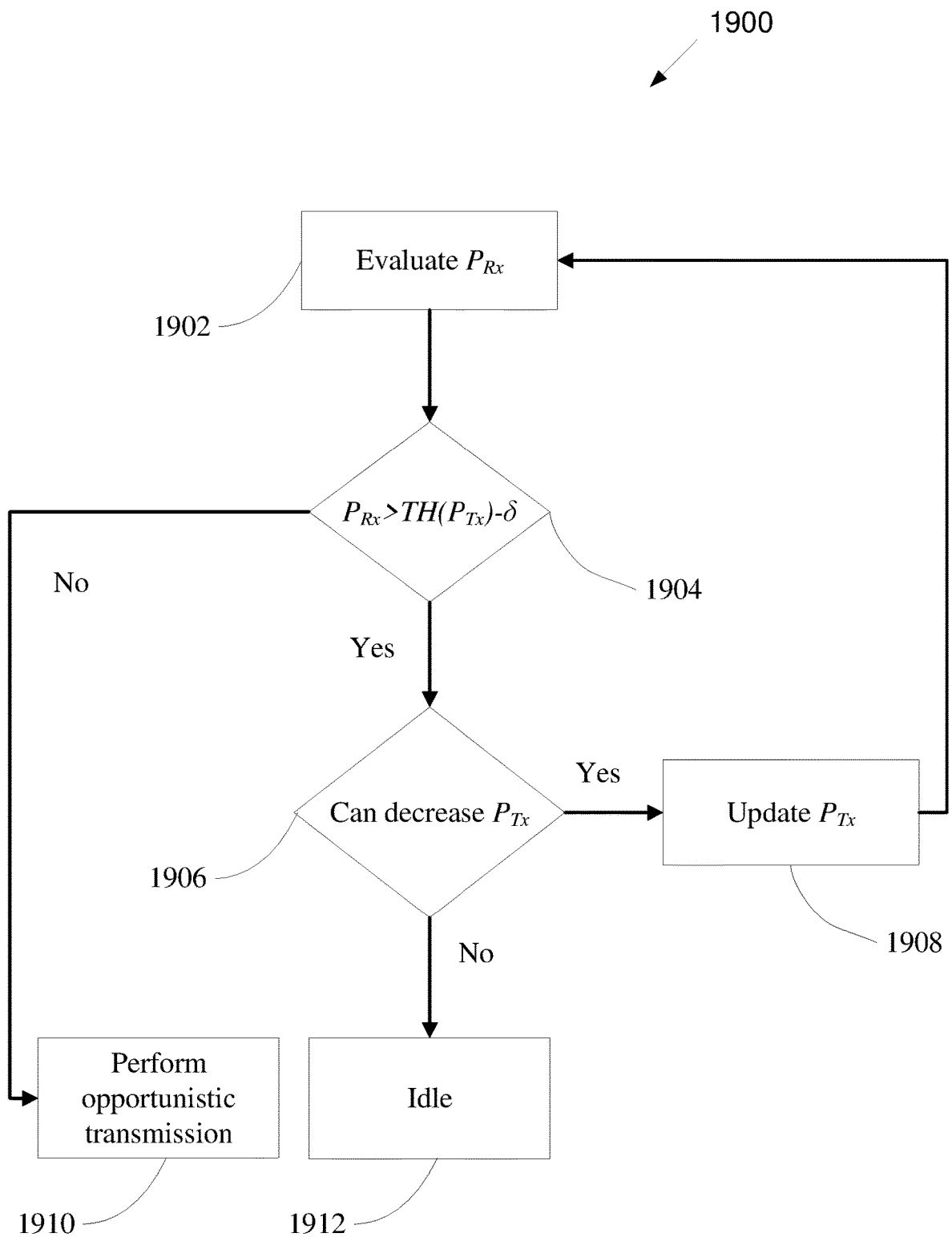
FIG. 19 illustrates a flowchart of a method for determining the opportunistic transmission according to embodiments of the present disclosure.

FIG. 19 illustrates a flowchart of a method 1900 for determining the opportunistic transmission according to embodiments of the present disclosure. For example, the method 1900 may be performed by a network entity such as, for example, gNB 102. An embodiment of the method 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

FIG. 19 illustrates a method 1900 to determine the feasibility of opportunistic transmission from a BS perspective consistent with embodiments disclosed herein. A BS which wants to participate opportunistic transmission may measure the received signal power over the medium as in step 1902.

In one embodiment, data transmission during DTP 1004 as illustrated in FIG. 10 includes a signal modulated by a sequence which can be detected with a correlator type receiver. An example of such signal can be a reference signal, a synchronization signal, or any form of training sequences. There could be many variations on the sequence type that can be included in the data transmission. The correlator output level can be one example of measured C-REQ signal strength. Other methods are not precluded such as energy detection-based scheme.

In step 1904, the received signal power $P_{Rx}$ is compared with a threshold. In one embodiment, the threshold can be a function of intended transmission power $P_{Tx}$ by the opportunistic transmitter.

In one example, such threshold function is illustrated in FIG. 17. The intended transmission power $P_{Tx}$ for opportunistic transmission can be different from the DTP power, $P_{Tx}^{DTP}$, which may be used to reserve the resource. δ is a value to allow for detection margin and to control the spatial reuse. In one embodiment, δ can be set to zero. In another embodiment, δ can be set to a positive value. In such embodiment, δ can be used to control the level of the spatial reuse. With a larger δ value, the opportunistic transmission is more discouraged.

In one embodiment, the value δ can be fixed. In another embodiment, the value δ can be negotiated between networks or entities controlling different networks. In yet another embodiment, the value δ can be different between the BSs belonging to the same network and between the BSs belonging to different networks. That is, there could bec $δ_{inter-op}$ and $δ_{intra-op}$. With this distinction, a spatial reuse can be allowed more generously between the BSs in the same network.

In one example where the original owner of the reserved resource does not transmit, the outcome of step 1904 may be "No" without power control, which leads to step 1910. Even when the outcome of step 1904 is "Yes," which leads to step 1906 as illustrated in FIG. 19, a BS can still attempt to perform opportunistic transmission if the BS can lower a transmission power at steps 1906 and 1908 such that the outcome of step 1904 becomes eventually "No."

If the BS cannot lower a transmission power due to any reason, the BS may surrender the spatial reuse opportunity as at step 1912. If the outcome of step 1904 is positive with the updated intended transmission power level, then the method 1900 may perform opportunistic transmission as at step 1910.

In another embodiment, function TH(•) can take the value δ as an input and may return the output threshold value adjusted according to the value δ.

Figure 20:
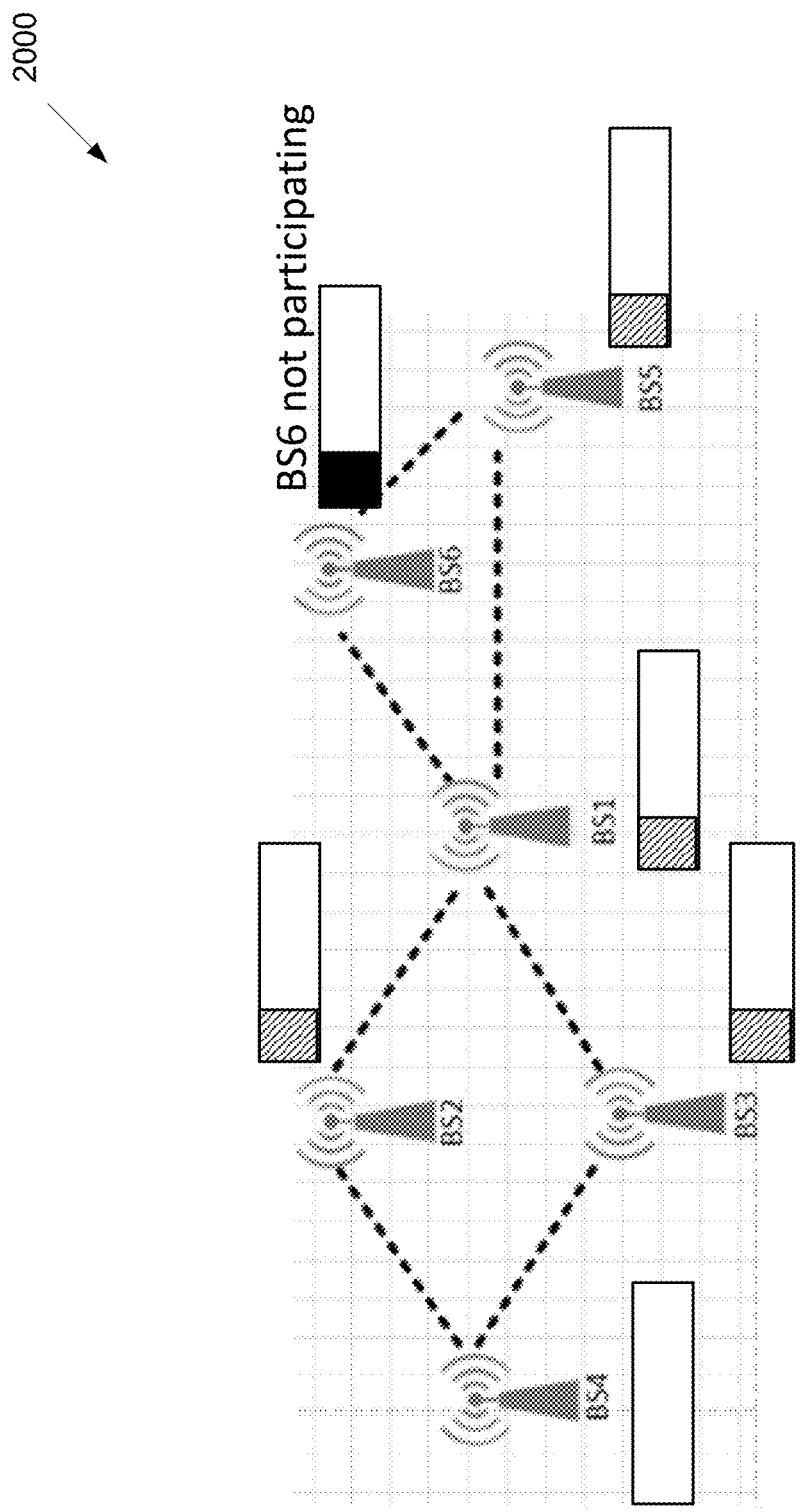
FIG. 20 illustrates an example spectrum sharing according to embodiments of the present disclosure.

FIG. 20 illustrates an example spectrum sharing 2000 according to embodiments of the present disclosure. An embodiment of the spectrum sharing 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 20, a BS may opt out of the spectrum sharing for certain coordination phases based on a certain criterion. Upon opting out, the BS may claim access to a guaranteed fixed amount of spectrum resource for this duration. This resource reservation can be transmitted in the C-REQ message by the BS. 1 hop neighbors upon receiving such a reservation decision in a C-REQ message may further broadcast the message to second hop neighbors (to avoid hidden node interference scenarios).

Figure 21:
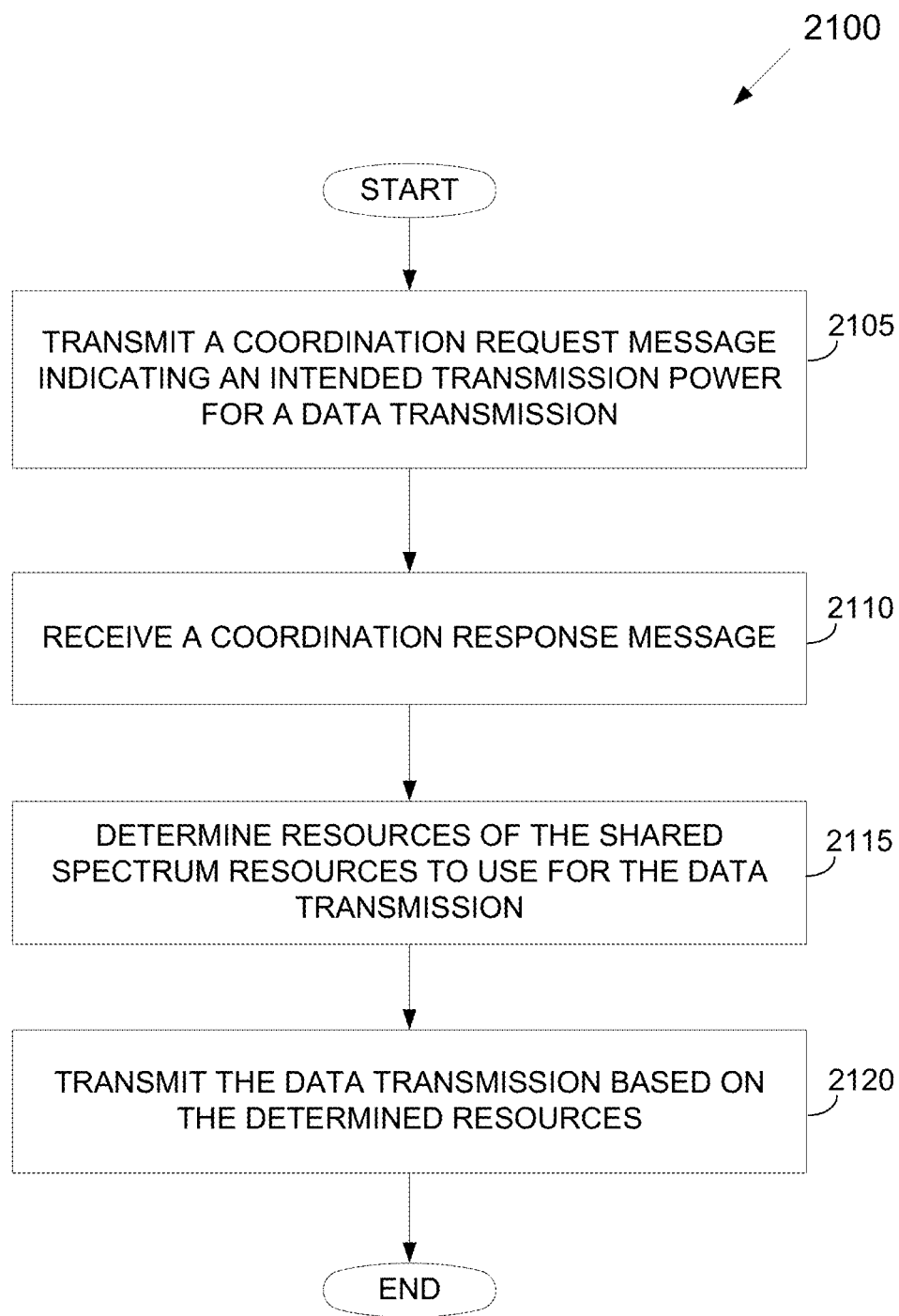
FIG. 21 illustrates an example of a method for operating a network entity in a wireless communication system of shared spectrum resources according to embodiments of the present disclosure.

FIG. 21 illustrates an example of a method 2100 for operating a network entity in a wireless communication system of shared spectrum resources according to embodiments of the present disclosure. For example, the method 2100 may be performed by a network entity such as, for example, gNB 102. An embodiment of the method 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

The method 2100 begins with the network entity transmitting, to neighbor network entities in the wireless communication system, a coordination request message indicating an intended transmission power for a data transmission by the network entity (step 2105). For example, in step 2105, the network entity may indicate the intended transmission power by transmitting the signal containing the coordination request message at the intended transmission power so that the neighbor network entities can identify an amount of interference that may be caused by the network entities' data transmissions. In another example, the network entity may indicate the intended transmission power by transmitting the signal containing the coordination request message at the intended transmission power plus a power threshold to increase the signal reception at neighboring network entities (e.g., as discussed above with regard to FIG. 15). This threshold can be preconfigured or may be indicated in the coordination request message. In another example, the network entity may indicate the intended transmission power by transmitting the signal containing the contents of the coordination request message at a transmission power that is unrelated to the intended transmission power of the data transmission but indicates the intended transmission power in the contents of the coordination request message.

In some embodiments, the network entity may determine some coordination and transmission phases to opt out or not participate in spectrum resource sharing. To opt out, the network entity may transmit, to its neighbor network entities, a coordination request message indicating a fixed amount of spectrum resources reserved by the network entity during the phases the network entity is opting out for and may otherwise not participate in exchanging coordination request and response messages. The one hop neighbor network entities of the network entity may then forward this opt out information and/or fixed reservation information to their neighbor network entities, for example, to avoid hidden node interference scenarios.

Thereafter, the network entity receives, from one or more of the neighbor network entities, a coordination response message in response to the coordination request message. (step 2110). For example, in step 2110, based on the coordination response message the network entity is informed of the coordination information of its neighbor network entity(ies).

In various embodiments, the network entity may be the receiver of coordination request message(s) from neighbor network entity(ies) and may use power information from the coordination request message to determine the potential of interference to the other neighbor network entity(ies). For example, the network entity may determine whether the neighbor network entity is within an interference range of the network entity based on the received coordination request message and the intended transmission power of the network entity. In one example, the network entity performs this determination by comparing at least a receive power of a signal (i.e., receive power plus potentially the power threshold if used by the neighbor network entity) for the received coordination request message with a threshold. This threshold is a function of the intended transmission power of the network entity, for example, the intended transmission power of the network entity may be scaled as a function of the amount of signal power loss that may occur between the two network entities and may include an additional threshold to reduce the chances of interference (e.g., as discussed above with regard to FIG. 16).

Additionally, the network entity may determine whether to transmit a coordination response message to the neighbor network entity in response to the received coordination request message based on the determination of whether the other neighbor network entity is within the interference range of the network entity. For example, if the neighbor network entity is outside of the interference range such that the data transmissions of the network entity are not likely to cause interference to the neighbor network entity, the network entity may not need to respond to the neighbor network entity. In one or more of these embodiments, the coordination request and/or response messages include at least one of a cell identifier, an operator identifier, a transmission power level, transmission beam information, a resource reservation success ratio, a priority level of the network entity for the shared spectrum resources, and an amount of bandwidth requested by the network entity.

The network entity then determines resources of the shared spectrum resources to use for the data transmission based on the intended transmission power and the coordination response message (step 2115). For example, in step 2115, the network entity may determine how many neighbors that are within an interference range based on its intended transmission power and the amount of resources that are available to those network entities within its range and reserves resources needed for the data transmission.

In some embodiments, the determined resources may be utilized opportunistically by the network entity. For example, the network entity may not reserve the resources used if the resources are not being used or if the network entity's utilization of the resources would not cause interference to its neighbors. In one embodiment of opportunistic channel access, the network entity senses whether the resources are idle for an initial offset during a data transmission period and can decide to use these resources for data transmission if the resources are idle for the initial offset. In some embodiments, the network entity may also use additional random backoff counter(s) to perform additional random backoff before using the resources for the data transmission (e.g., as discussed above with regard to FIG. 18). In another embodiment of opportunistic channel access, the network entity receiving a signal transmitted by another of the set of neighbor network entities (e.g., during the data transmission period or as part of coordination) and determining, based on the received signal, whether transmitting the data transmission at the intended transmission power would cause the network entity to interfere with transmissions of the other neighbor network entity. If not, the network entity may use those resources of the non-interfering neighbor network entity. If so, the network entity may perform additional steps to determine if it could decrease the intended transmission power to avoid the interference and still perform the data transmission at the decreased power (e.g., as discussed above with regard to FIG. 19). In some embodiments, this determination is based on comparison of at least a receive power of the received signal (i.e., receive power plus potentially a power threshold) with a threshold, which is a function of the intended transmission power of the network entity, minus, in some embodiments, a spatial reuse parameter that is selected to control the amount of spatial reuse of resources.

The network entity then transmit, to at least one terminal in a cell of the network entity, the data transmission based on the determined resources. (step 2120). For example, in step 2120, the resources for the data transmission may be reserved and dedicated to the network entity or may be used opportunistically.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A network entity in a wireless communication system of shared spectrum resources, the network entity comprising:
   a transceiver configured to:
      transmit, to a set of neighbor network entities in the wireless communication system, a coordination request message indicating an intended transmission power for a data transmission by the network entity; and
      receive, from at least one of the set of neighbor network entities, a coordination response message in response to the coordination request message; and
   a processor operably connected to the transceiver, the processor configured to:
      determine resources of the shared spectrum resources to use for the data transmission based on the intended transmission power and the coordination response message,
   wherein the transceiver is configured to transmit, to at least one terminal in a cell of the network entity, the data transmission based on the determined resources, and
   wherein the processor is configured to, based the coordination response message, determine whether transmitting the data transmission at the intended transmission power would cause the network entity to interfere with transmissions of another neighbor network entity of the set of neighbor network entities based on a comparison of at least a receive power of the coordination response message with a threshold, which is a function of the intended transmission power of the network entity, minus a spatial reuse parameter.

2. The network entity of claim 1, wherein:
   a signal for the coordination request message is transmitted at the intended transmission power, or
   the signal for the coordination request message is transmitted at the intended transmission power increased by a threshold amount and the threshold amount is preset or indicated in the coordination request message.

3. The network entity of claim 1, wherein:
   the transceiver is further configured to receive, from another of the set of neighbor network entities, a coordination request message, and
   the processor is configured to:
      determine whether the other neighbor network entity is within an interference range of the network entity based on the received coordination request message and the intended transmission power of the network entity, and
      determine whether to transmit a coordination response message to the other neighbor network entity based on the determination of whether the other neighbor network entity is within the interference range of the network entity.

4. The network entity of claim 3, wherein to determine whether the other neighbor network entity would cause interference to the network entity, the processor is configured to compare at least a receive power of a signal for the received coordination request message with a threshold that is a function of the intended transmission power of the network entity.

5. The network entity of claim 1, wherein:
   to determine the resources of the shared spectrum resources to use for the data transmission, the processor is configured to:
      determine, based on sensing, whether the resources, which are not reserved for the network entity, are idle for an initial offset during a data transmission period, and
      determine to use the resources for the data transmission for the data transmission period based on determining that the resources are idle for the initial offset.

6. The network entity of claim 5, wherein the processor is further configured to use a random backoff counter, when the resources are sensed as idle for the initial offset, to perform additional random backoff before using the resources for the data transmission.

7. The network entity of claim 1, wherein:
   the transceiver is further configured to receive a signal transmitted by the other neighbor network entity of the set of neighbor network entities, the processor is configured to:
  based on determining that transmitting at the intended transmission power would cause interference, determine an amount to decrease the intended transmission power by to avoid the interference and whether the network entity can transmit the data transmission at the decreased amount.

8. The network entity of claim 1, wherein:
the processor is configured to determine a phase to not perform spectrum resource sharing, and
the transceiver is configured to transmit, to the set of neighbor network entities, a coordination request message indicating a fixed amount of spectrum resources reserved by the network entity during the phase for indication to neighbors of the set of neighbor network entities.

9. The network entity of claim 1, wherein the coordination request or response messages include at least one of a cell identifier, an operator identifier, a transmission power level, transmission beam information, a resource reservation success ratio, a priority level of the network entity for the shared spectrum resources, and an amount of bandwidth requested by the network entity.

10. A method for operating a network entity in a wireless communication system of shared spectrum resources, the method comprising:
  transmitting, to a set of neighbor network entities in the wireless communication system, a coordination request message indicating an intended transmission power for a data transmission by the network entity;
  receiving, from at least one of the set of neighbor network entities, a coordination response message in response to the coordination request message;
  determining resources of the shared spectrum resources to use for the data transmission based on the intended transmission power and the coordination response message;
  determining, based on the coordination response message, whether transmitting the data transmission at the intended transmission power would cause the network entity to interfere with transmissions of another neighbor network entity of the set of neighbor network entities based on a comparison of at least a receive power of the coordination response message with a threshold, which is a function of the intended transmission power of the network entity, minus a spatial reuse Parameter; and
  transmitting, to at least one terminal in a cell of the network entity, the data transmission based on the determined resources.

11. The method of claim 10, wherein:
a signal for the coordination request message is transmitted at the intended transmission power, or
the signal for the coordination request message is transmitted at the intended transmission power increased by a threshold amount and the threshold amount is preset or indicated in the coordination request message.

12. The method of claim 10, further comprising:
  receiving, from another of the set of neighbor network entities, a coordination request message;
  determining whether the other neighbor network entity is within an interference range of the network entity based on the received coordination request message and the intended transmission power of the network entity; and
  determining whether to transmit a coordination response message to the other neighbor network entity based on the determination of whether the other neighbor network entity is within the interference range of the network entity.

13. The method of claim 12, wherein determining whether the other neighbor network entity would cause interference to the network entity comprises comparing at least a receive power of a signal for the received coordination request message with a threshold that is a function of the intended transmission power of the network entity.

14. The method of claim 10, wherein determining the resources of the shared spectrum resources to use for the data transmission, comprises:
  determining, based on sensing, whether the resources, which are not reserved for the network entity, are idle for an initial offset during a data transmission period; and
  determining to use the resources for the data transmission for the data transmission period based on determining that the resources are idle for the initial offset.

15. The method of claim 14, further comprising using a random backoff counter, when the resources are sensed as idle for the initial offset, to perform additional random backoff before using the resources for the data transmission.

16. The method of claim 10, further comprising:
  receiving a signal transmitted by the other neighbor network entity of the set of neighbor network entities;
  based on determining that transmitting at the intended transmission power would cause interference, determining an amount to decrease the intended transmission power by to avoid the interference and whether the network entity can transmit the data transmission at the decreased amount.

17. The method of claim 10, further comprising:
  determine a phase to not perform spectrum resource sharing; and
  transmitting, to the set of neighbor network entities, a coordination request message indicating a fixed amount of spectrum resources reserved by the network entity during the phase for indication to neighbors of the set of neighbor network entities.

18. The method of claim 10, wherein the coordination request or response messages include at least one of a cell identifier, an operator identifier, a transmission power level, transmission beam information, a resource reservation success ratio, a priority level of the network entity for the shared spectrum resources, and an amount of bandwidth requested by the network entity.

* * * * *